US011981065B1

(12) United States Patent
Rapp et al.

(10) Patent No.: US 11,981,065 B1
(45) Date of Patent: May 14, 2024

(54) SYSTEMS AND METHODS FOR MANUFACTURING COLORED PRODUCT

(71) Applicant: Columbia Insurance Company, Omaha, NE (US)

(72) Inventors: Richard Rapp, Dalton, GA (US); Kimberly McKenzie, Dalton, GA (US); Joel Corn, Dalton, GA (US); Domenick De Cesaris, Dalton, GA (US); Brad Medley, Dalton, GA (US); Alex Freas, Dalton, GA (US); Luke Tixier, Dalton, GA (US); Berry Rentz, Dalton, GA (US); Daniela Echeverri, Dalton, GA (US)

(73) Assignee: Columbia Insurance Company, Omaha, NE (US)

(*) Notice: Subject to any disclaimer, the term of this patent is extended or adjusted under 35 U.S.C. 154(b) by 36 days.

(21) Appl. No.: 17/367,924

(22) Filed: Jul. 6, 2021

Related U.S. Application Data

(60) Provisional application No. 63/048,425, filed on Jul. 6, 2020.

(51) Int. Cl.
*B29C 48/285* (2019.01)
*B29C 48/05* (2019.01)
(Continued)

(52) U.S. Cl.
CPC ............ *B29C 48/288* (2019.02); *B29C 48/05* (2019.02); *B29C 48/92* (2019.02); *D01D 1/06* (2013.01);
(Continued)

(58) Field of Classification Search
CPC ........ B29C 48/288; B29C 2948/92333; B29C 2948/92304; B29C 48/92; B29C 48/05; D01D 1/06
See application file for complete search history.

(56) References Cited

U.S. PATENT DOCUMENTS

| | | | |
|---|---|---|---|
| 4,017,249 A * | 4/1977 | Lenk | D01D 1/06 425/382.2 |
| 4,371,096 A | 2/1983 | Scholl et al. | |

(Continued)

FOREIGN PATENT DOCUMENTS

| | | | |
|---|---|---|---|
| CN | 205628658 U | | 10/2016 |
| CN | 211865874 U | * | 11/2020 |
| EP | 1482077 A1 | | 12/2004 |

OTHER PUBLICATIONS

Oerlikon Barmag, "Rectangular Melt Spinning Pumps for Manmade Fibers", Jan. 2014.

(Continued)

*Primary Examiner* — Farah Taufiq
(74) *Attorney, Agent, or Firm* — Ballard Spahr LLP

(57) ABSTRACT

A system for making polymeric fibers can comprise a main extruder configured to receive a polymer feedstock composition. The main extruder can have an outlet in fluid communication with a transfer line configured to receive a polymer melt from the main extruder and transfer the polymer melt in a flow direction that is towards a spinneret. A side arm extruder assembly can be positioned along the transfer line between the main extruder and the spinneret. The side arm extruder assembly can comprise an outlet positioned within the transfer line to inject a colored polymer melt concentrate into the transfer line.

20 Claims, 33 Drawing Sheets

(51) Int. Cl.
*B29C 48/92* (2019.01)
*D01D 1/06* (2006.01)

(52) U.S. Cl.
CPC .............. *B29C 2948/92304* (2019.02); *B29C 2948/92333* (2019.02)

(56) References Cited

U.S. PATENT DOCUMENTS

| | | | | |
|---|---|---|---|---|
| 5,176,299 | A * | 1/1993 | Krooss | ............... B65G 47/1407 |
| | | | | 414/745.9 |
| 5,723,517 | A | 3/1998 | Campo et al. | |
| 6,041,819 | A | 3/2000 | Walleman | |
| 6,073,657 | A * | 6/2000 | Hippelainen | ......... F16L 59/143 |
| | | | | 138/125 |
| 6,726,465 | B2 | 4/2004 | Groleau | |
| 6,736,624 | B1 * | 5/2004 | Tietze | ...................... D01D 1/09 |
| | | | | 425/464 |
| 9,327,443 | B2 | 5/2016 | Himes et al. | |
| 10,695,953 | B2 | 6/2020 | Clark | |
| 10,751,915 | B2 | 8/2020 | Clark | |
| 2005/0213423 | A1 * | 9/2005 | Ferencz | ................ B29C 48/832 |
| | | | | 366/76.2 |
| 2011/0316191 | A1 * | 12/2011 | Di Simone | ......... B29C 45/1603 |
| | | | | 425/190 |
| 2015/0314513 | A1 * | 11/2015 | Takamoto | ................ B29B 7/82 |
| | | | | 366/75 |
| 2018/0126595 | A1 * | 5/2018 | Clark | .................... B29B 13/022 |
| 2019/0085483 | A1 | 3/2019 | Clark | |
| 2021/0046689 | A1 | 2/2021 | Torsten et al. | |
| 2021/0323198 | A1 * | 10/2021 | Lupisan | .............. B29B 17/0026 |
| 2022/0097283 | A1 * | 3/2022 | Keller | ................... B29C 48/914 |
| 2022/0250322 | A1 * | 8/2022 | Tobin | .................... B29C 48/02 |

OTHER PUBLICATIONS

Callari, J., Plastics Technology, "Extrusion/Compounding at K 2013: Having it All", https://www.ptonline.com/articles/extrusioncompounding-at-k-2013-having-it-all, Dec. 18, 2013.
Lyondell Basell, "A Guide to Polyolefin Extrusion Coating", https://www.lyondellbaseil.com/globalassets/documents/polymers-technical-literature/a_guide_to_polyolefin_extrusion_coating.pdf. Accessed Apr. 2021.

* cited by examiner

US 11,981,065 B1

SYSTEMS AND METHODS FOR MANUFACTURING COLORED PRODUCT

CROSS-REFERENCE TO RELATED APPLICATIONS

This application claims priority to and the benefit of the filing date of U.S. Provisional Patent Application No. 63/048,425, filed Jul. 6, 2020, the entirety of which is hereby incorporated by reference herein in its entirety for all purposes.

FIELD

This disclosure relates to systems and methods for manufacturing colored product, such as, for example, colored yarn, and, in particular, to minimizing waste in changing between colors.

BACKGROUND

Conventionally, colored yarn is formed via colored resin fed into a main extruder. Each color change requires entirely purging the colored yarn resin from the main extruder, which is costly both in terms of material waste and time required to perform the color change. Accordingly there is a need for a system and a method that allows for more efficient color changes.

SUMMARY

Disclosed herein, in one aspect, is a system for making polymeric product comprising a primary polymer melt source configured to receive a polymer feedstock composition. The primary polymer melt source has an outlet in fluid communication with a transfer line configured to receive a polymer melt from the primary polymer melt source and transfer the polymer melt in a flow direction that is towards a product forming device. A side arm extruder assembly can be positioned along the transfer line between the primary polymer melt source and the product forming device. The side arm extruder assembly can comprise an outlet positioned within the transfer line to inject a colored polymer melt concentrate into the transfer line.

In further aspects, a method of producing a colored polymer melt can comprise the steps of: flowing a primary polymer melt in a transfer line from a primary polymer melt source in a flow direction that is towards a product forming device; and injecting a first colored polymer melt concentrate from an outlet of a side arm extruder assembly into the flowing primary polymer melt, thereby producing a first colored polymer melt.

In still further aspects, a winder for forming a yarn package can have a spindle axis. The winder can comprise a spindle that is configured to be rotatably driven about the spindle axis. A color probe can be positioned with respect to the spindle to measure a color value of yarn wound on the spindle.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
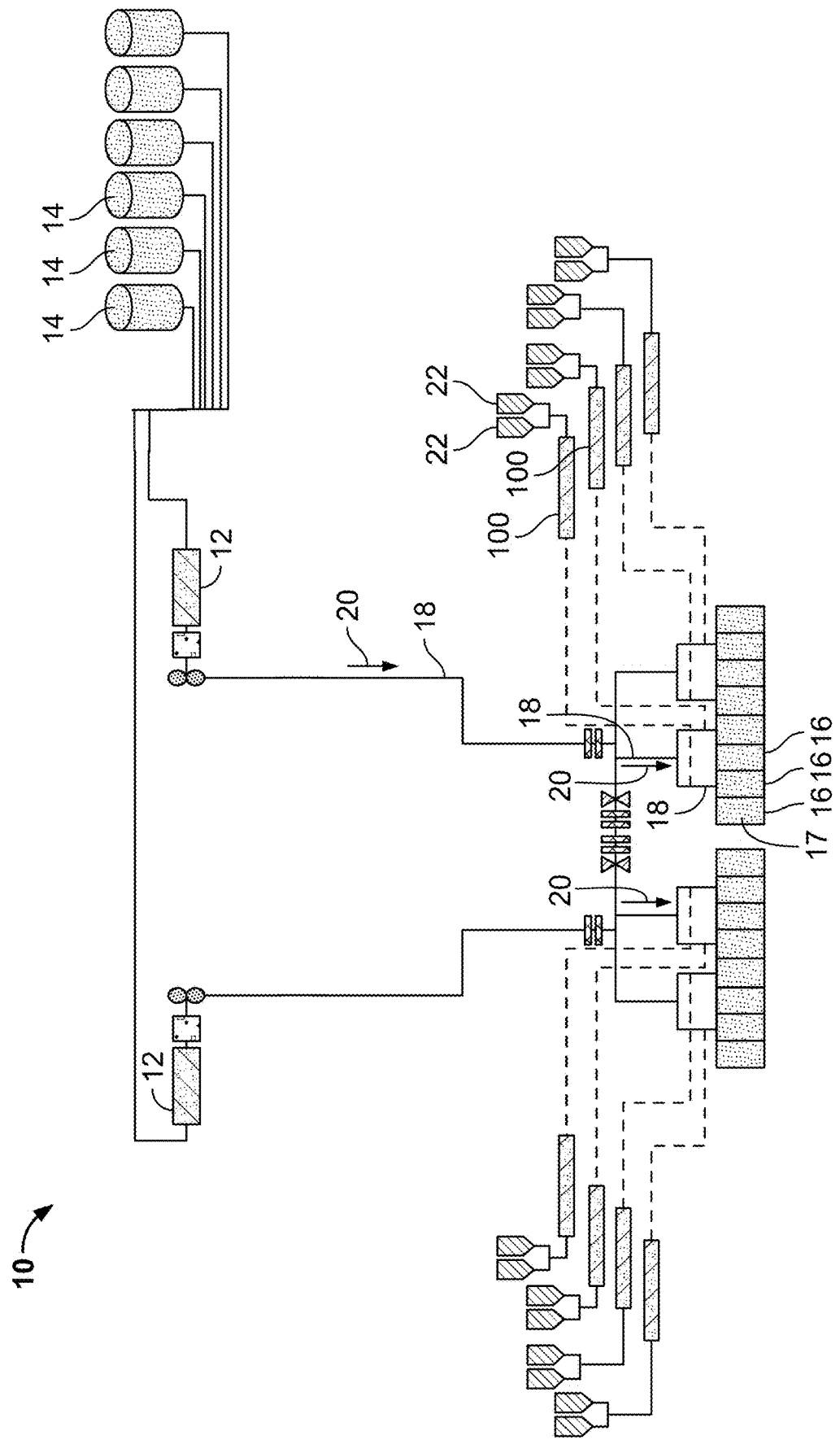
FIG. 1 is schematic of a system for colored yarn production in accordance with embodiments of the present disclosure.

The disclosed system and method may be understood more readily by reference to the following detailed description of particular embodiments and the examples included therein and to the Figures and their previous and following description.

It is to be understood that the terminology used herein is for the purpose of describing particular embodiments only and is not intended to limit the scope of the present invention which will be limited only by the appended claims.

It must be noted that as used herein and in the appended claims, the singular forms "a," "an," and "the" include plural references unless the context clearly dictates otherwise. Thus, for example, reference to "a side arm extruder assembly" includes one or more of such side arm extruder assemblies, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values are approximated by use of the antecedents "about," "substantially," or "generally," it is contemplated that values within up to 15%, up to 10%, up to 5%, or up to 1% (above or below) of the particularly stated value or characteristic can be included within the scope of those aspects. Similarly, for antecedents "about," "substantially," or "generally," with reference to parallel or perpendicular, it is contemplated that angular offsets up to 10 degrees, or up to 5 degrees, or up to one degree are contemplated.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

Disclosed herein, in various aspects and with reference to FIG. 1, is a system 10 for making colored yarn. The system 10 can comprise one or more main extruders 12 that can receive polymer feedstock composition from dryers 14 or other material storage bins. The main extruders 12 can serve as the primary melt source that can provide a primary polymer melt. The primary polymer melt can be non-colored polymer melt. Although exemplary embodiments show one or more main extruders 12 as the primary melt source that supplies the primary polymer melt, other primary polymer melt sources are contemplated, including, but not limited to, a melting pin or a polymerization reactor. The main extruders 12 can have an outlet in fluid communication with a respective transfer line 18. The transfer lines 18 can be configured to receive a primary polymer melt from the main extruder 12 (or other primary melt source) and transfer the primary polymer melt to one or more spinnerets 16 (or other product forming devices) in respective flow directions 20 toward the spinnerets. In some aspects, the primary polymer melt can be provided to the spinnerets 16 via one or more spinneret manifolds 17. It is contemplated that each spinneret manifold 17 can provide polymer melt to one or more (e.g., three or six) spinnerets 16. The transfer lines 18 can branch outwardly so that one main extruder 12 can feed a plurality of spinnerets manifolds 17. The primary polymer melt can comprise one or more polymers, including polyethylene terephthalate (PET), polypropylene, polyethylene, polyamide (e.g., PA-6 or PA-66), polytrimethylene terephthalate (PTT), poly-lactic acid (PLA), or any suitable polymer or combination of polymers. In some optional aspects, the primary polymer melt from the main extruders 12 or other primary melt source can optionally be colored or non-colored. For example, the primary melt source can be the main extruder 12, and the primary polymer melt can be non-colored. In further optional aspects, the primary polymer melt from the main extruders 12 can comprise additives including, for example, a deep dye additive, a light dye additive, $TiO_2$, a UV stabilizer, processing aids, process stabilizers, etc., or a combination thereof. In some aspects, the primary polymer melt from the main extruders 12 can be virgin polymer, recycled polymer, or a combination thereof.

At least one side arm extruder assembly 100 can be positioned along the transfer line 18 between the main extruder 12 and a spinneret 16. The side arm extruder assembly 100 can comprise an outlet 101 (FIG. 4) positioned within the transfer line 18 that can inject a colored polymer melt concentrate into a respective transfer line 18 upstream of one or more spinneret manifolds 17 that are fed by said transfer line 18. It is contemplated that a plurality of side arm extruder assemblies 100 can be configured to inject colored polymer melt concentrate and/or polymer melt additive into respective transfer lines 18. In further optional aspects, the side arm extruder assemblies 100 can be configured to inject additives including, for example, a deep dye additive, a light dye additive, $TiO_2$, a UV stabilizer, processing aids, process stabilizers, etc. In some aspects, one side arm assembly 100 can inject colored polymer melt concentrate into a respective transfer line 18 that feeds a single spinneret manifold 17. In further aspects, the side arm extruder assembly 100 can feed a single transfer line 18 that can subsequently branch to feed multiple (e.g., two or four) spinneret manifolds 17. The side arm extruder assemblies 100 can receive colored polymer concentrate from one or more concentrate dryers 22 or other storage bins and provide colored polymer melt concentrate into the transfer line 18 at respective side arm extruder assembly outlets 101 (FIG. 4).

Referring to FIGS. 2 and 3A-3C, each side arm extruder assembly 100 (FIG. 1) can comprise an extruder 102 that is upstream of a melt pump 106 so that flow from an outlet 104 of the extruder 102 is in fluid communication with an inlet 108 of the melt pump 106. An outlet 110 of the melt pump 106 can be in fluid communication with an inlet 132 of a product channel 135 of a first diverter valve 130 (optionally, the only diverter valve of the side arm extruder assembly 100). The first diverter valve 130 is referred to herein also as the first valve. An outlet 134 of the product channel 135 of the first diverter valve 130 can be in fluid communication with the outlet 101 (FIG. 4) of the side arm extruder assembly 100. In this way, flow from the melt pump 106 can travel through the first diverter valve 130 and into a mixing union 114 that is within the transfer line 18. The melt pump 106 can be configured to meter the colored polymer melt concentrate entering the transfer line 18 at the necessary percentage (or let down) relative to the total polymer fed to the spinneret manifolds 17. Accordingly, the melt pump 106 and/or the extruder 102 can be in communication with a computing device (e.g., computing device 1001 of FIG. 24) for controlling the pump rate based on various metrics (e.g., a known flow rate of primary polymer melt, the melt density, etc.). The melt pump 106 can optionally be a conventional positive displacement pump using two toothed gears that rotate in opposite directions. Such a melt pump can be about a tenth of the volume of a conventional spin pump.

The first diverter valve 130 can have a product channel 135 having an inlet 132 and outlet 134. The inlet 132 of the product channel 135 of the first diverter valve 130 can be in fluid communication with the outlet of the melt pump 106, and the outlet 134 of the product channel 135 can be in communication with the outlet 101 (FIG. 4) of the side arm extruder assembly 100. The first diverter valve 130 can further comprise a diverting function as defined by the movement of a diverter, which can optionally be embodied as a valve slide plate 138. When the slide plate 138 of the first diverter valve 130 is in a first position (FIG. 3A), the inlet 132 can be in fluid communication with the outlet 134. When the slide plate 138 of the first diverter valve 130 is in a second position (FIG. 3B), the inlet 132 of the first diverter valve 130 can be in communication with a second purge channel 139, and the outlet 134 of the first diverter valve 130 can be in communication with the first purge channel 136. In this position, primary polymer melt can (back)flow from the transfer line 18 through the outlet 134 and out the first purge channel 136 (thereby purging colored polymer melt concentrate from the mixing union), and colored polymer melt from the melt pump can be purged through the inlet 132 and out the second purge channel 139. In this way, polymer melt concentrate can be purged from the side arm extruder assembly 100 without injecting the colored polymer melt concentrate into the transfer line 18. In further optional aspects, when the slide plate 138 is in the third position (FIG. 3C), the inlet 132 is in communication with a third purge channel 137 of the first diverter valve 130. Thus, the slide plate 138 can be selectively positioned to direct a flow of colored polymer melt concentrate from the melt pump 106 to the third purge channel 137 via a portion of the product channel 135. Further, when the slide plate 138 is in the third position, the valve can block the fluid pathway from the transfer line 18, thereby isolating the side arm extruder assembly 100 from the main transfer line 18, which can be useful in maintenance of the side arm assembly.

Figure 4:
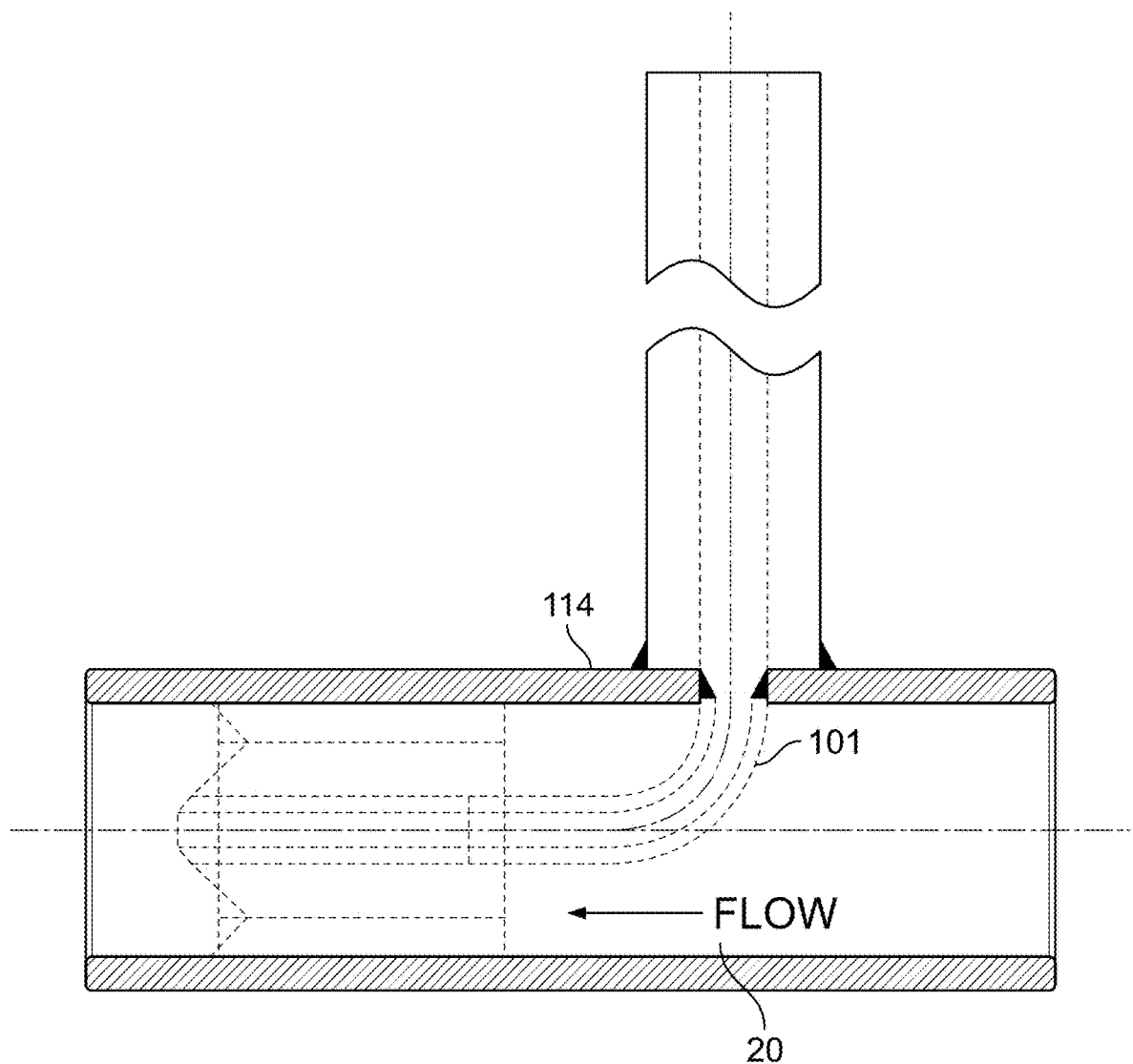
FIG. 4 is a cross section of a transfer line illustrating injection of colored polymer melt concentrate from the side arm extruder assembly in a co-current direction in accordance with the present disclosure.
Figure 5:
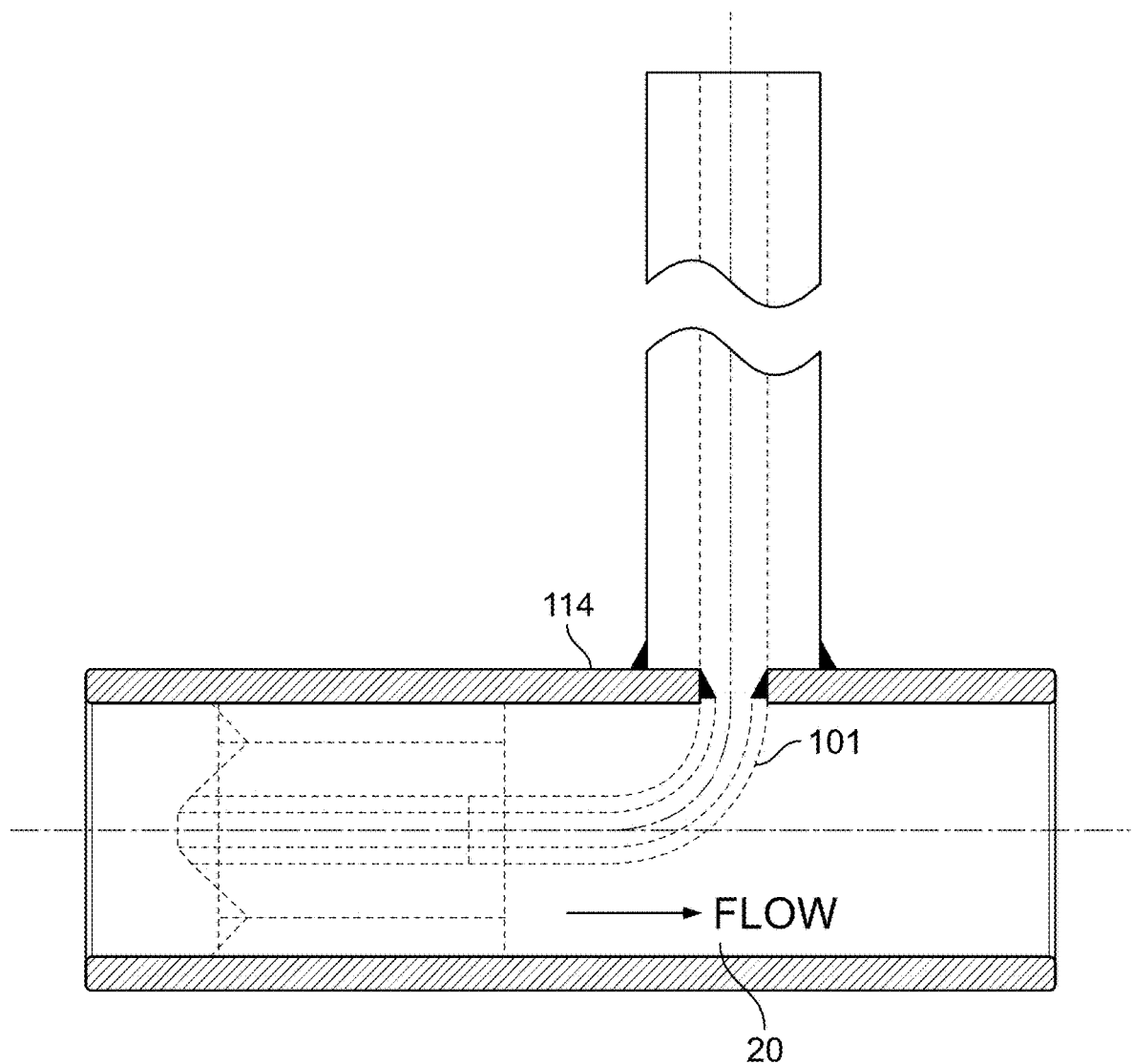
FIG. 5 is a cross section of a transfer line illustrating injection of colored yarn polymer concentrate from the side arm extruder assembly in a counter-current direction in accordance with the present disclosure.

Referring to FIGS. 4-5, in some optional aspects, the colored polymer melt concentrate can enter the transfer line 18 in a direction that is opposite the flow direction 20 of the transfer line 18. Injecting the molten color concentrate in contra-flow to the flow direction of the primary polymer melt (counter-current) can cause the molten color to be split up into a plurality of streams that then reverse flow to pass through the mixing union in the flow direction 20. One or more static mixers or other mixers can be provided downstream of the mixing union 114.

In further aspects, the colored polymer melt concentrate can enter the transfer line 18 co-current to the flow or perpendicular to or at any other angle relative to the direction of the flow through the transfer line 18, and one or more mixers (e.g., a static mixer) downstream can mix the colored polymer melt concentrate with the polymer melt from the main extruder. In yet further aspects, the colored polymer melt concentrate can enter the transfer line 18 both co-current and counter-current to the primary polymer melt flow direction 20.

Figure 2:
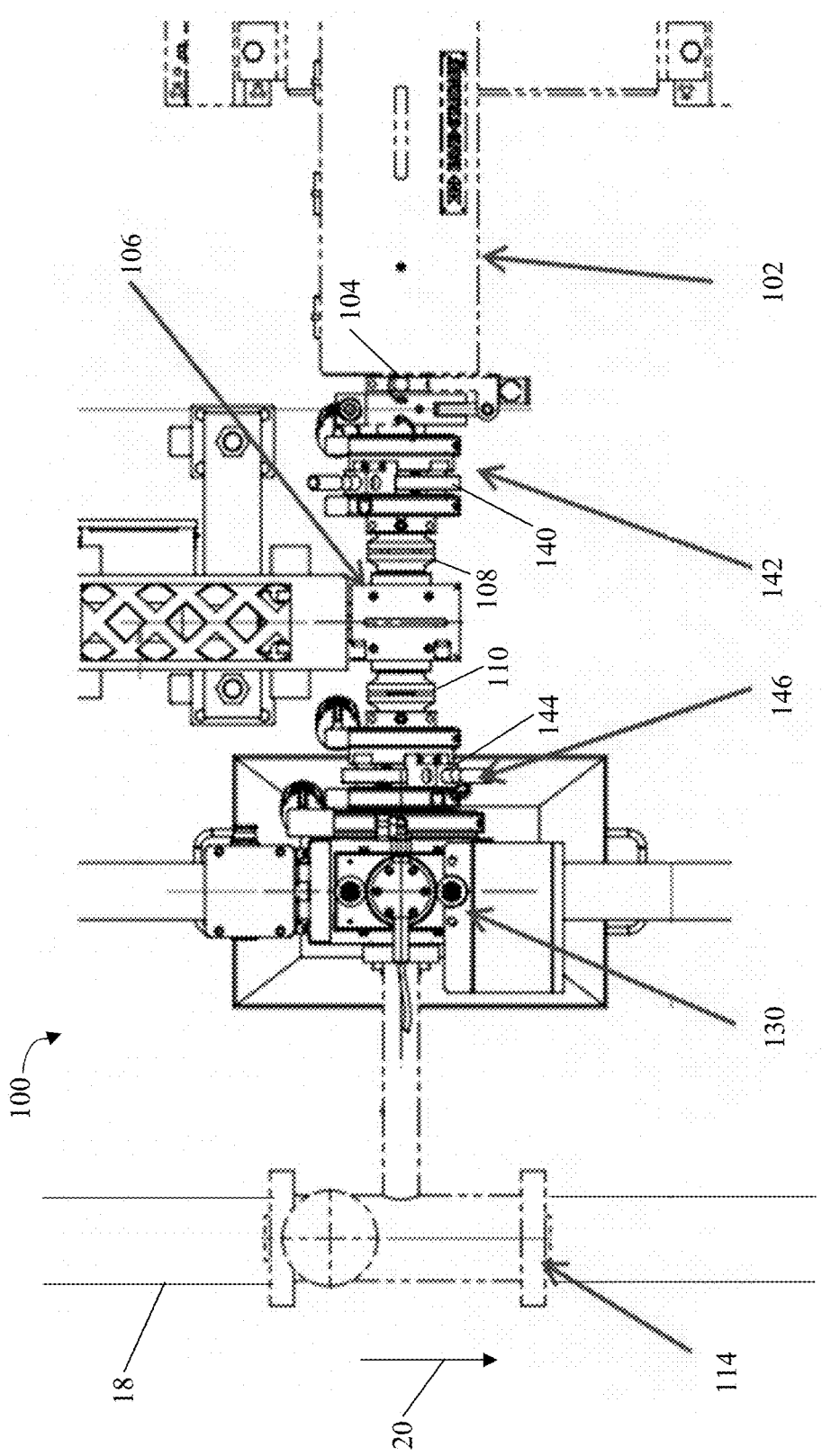
FIG. 2 is a top view of a side arm extruder assembly of the system as in FIG. 1.

Referring to FIG. 2, a first filter 140 can be disposed within a first manual or automatic screen changer 142, and a second filter 144 can be disposed within a second manual or automatic screen changer 146. The first filter can be positioned between the extruder 102 and the melt pump 106. The second filter 144 can be positioned between the melt pump 106 and the first diverter valve 130. The first filter 140 and the first screen changer 142 (positioned prior to the pump relative to the flow of the polymer melt) can protect the melt pump from any metal or other solid contaminants that could damage the pump. The second filter 144 and the second screen changer 146 (positioned after the melt pump relative to the flow of the polymer melt) can protect the spin pumps in the fiber line downstream from damaging solid contaminants.

Figure 8:
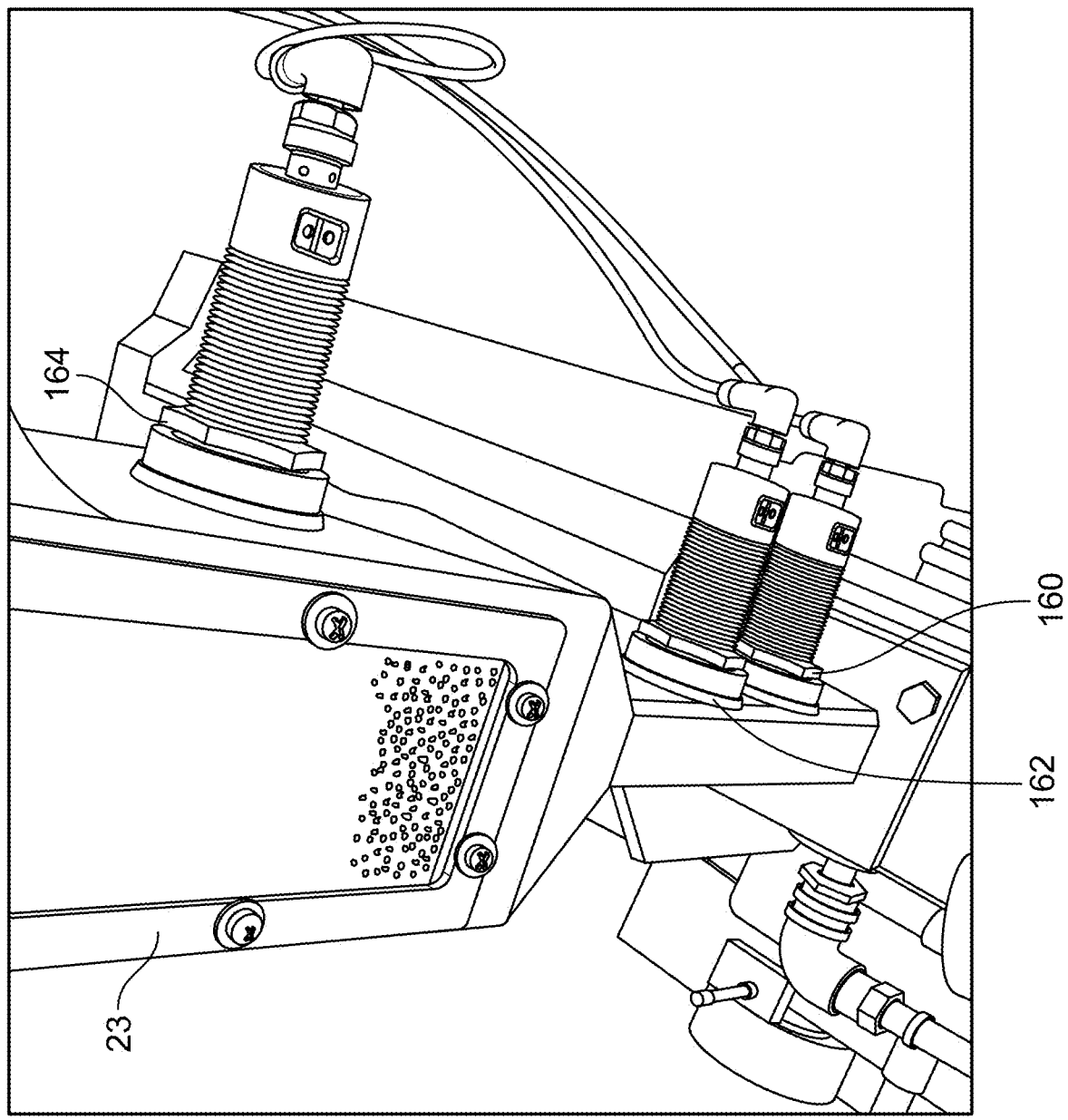
FIG. 8 is a perspective view of a hopper for feeding the side arm extruder assembly as in FIG. 2 or FIG. 6.

Referring to FIG. 8, the dryer 22 (FIG. 1) can feed a downcomer 23 (hopper). The downcomer 23 can comprise a first proximity switch 160 positioned at a bottom of the downcomer, a second proximity switch 162 that is positioned just above the first proximity switch, and a third proximity switch 164 that is substantially above the first and second proximity switches, wherein each of the first, second, and third proximity switches is configured to determine a presence or absence of polymer concentrate. Accordingly, each of the first, second, and third proximity switches 160, 162, 164 can serve as level sensors. In further aspects, lasers, ultrasonic sensors, or any other suitable sensor can be used to detect a presence or absence of polymer at a particular level in the downcomer.

Figure 27B:
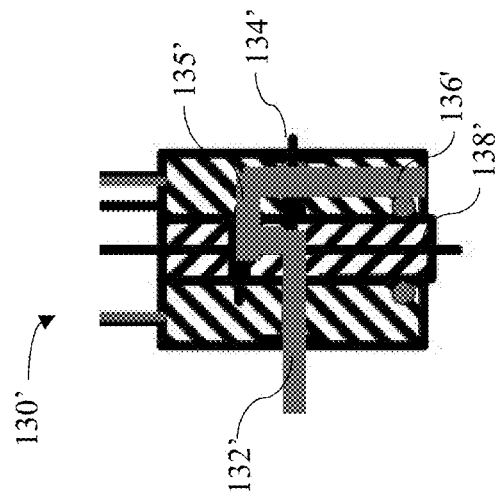
FIG. 27B is a cross section of the exemplary first diverter valve of FIG. 27A in a second position.
Figure 27A:
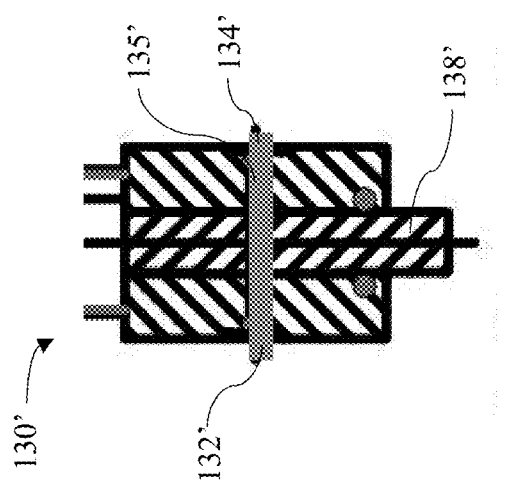
FIG. 27A is a cross section of an exemplary first diverter valve for use with the sidearm extruder assembly as in FIG. 6 in a first position.

Referring to FIGS. 6 and 7A-7C, in an alternative embodiment of a side arm extruder assembly 100', the side arm extruder assembly 100' can comprise a first diverter valve 130' that can be in fluid communication between the outlet 110 of the melt pump 106 and the transfer line 18. The first diverter valve 130' can have a diverter, which can be embodied as a slide plate 138'. The slide plate 138' can optionally have two operational positions, as shown in FIGS. 27A and 27B. With the slide plate in the first position (FIG. 27A), the outlet 110 of the melt pump 106 is in fluid communication with the inlet 132' via the product channel 135'. The outlet 134' of the product channel 135' can, in turn, be in fluid communication with the transfer line 18 via the mixing union 114. With the slide plate 138' moved to the second position (FIG. 27B), the color concentrate can be purged through a purge channel 136'. In addition, when the slide plate 138' is in the second position, the outlet 134' can be blocked such that the side arm extruder assembly 100' is isolated from the transfer line 18, which can be advantageous for maintenance of the side arm extruder assembly.

A second diverter valve 112 (FIGS. 7A-7C, referred to herein also as the second valve) can be disposed between the extruder 102 and the melt pump 106. The second diverter valve 112 can define a product channel 117. The outlet of the sidearm extruder 102 can be in communication with the inlet 118 of the product channel 117 of the second diverter valve 112. The outlet 120 of the product channel 117 of the second diverter valve 112 can be in communication with the inlet of the melt pump 106. A diverter, which can optionally be embodied as a slide plate 116, can be positioned to direct the flow of colored polymer melt concentrate from the extruder 102 to the first purge channel 115A via a first portion of the product channel 117, and allow a second purge of material from the outlet 101 (FIG. 4) of the mixing union 114 backwards through the first diverter valve 130' and the melt pump through the second purge channel 115B via a second portion of the product channel 117. To accomplish this latter purge, the melt pump can be able to rotate in the opposite direction, and the first diverter valve can be left in its first (production) position (FIG. 27A) such that primary polymer melt is pumped from the main polymer transfer line 18 backwards through the first diverter valve 130', through the melt pump 106, and out the second diverter valve purge port 115B of the second diverter valve 112.

Figure 26:
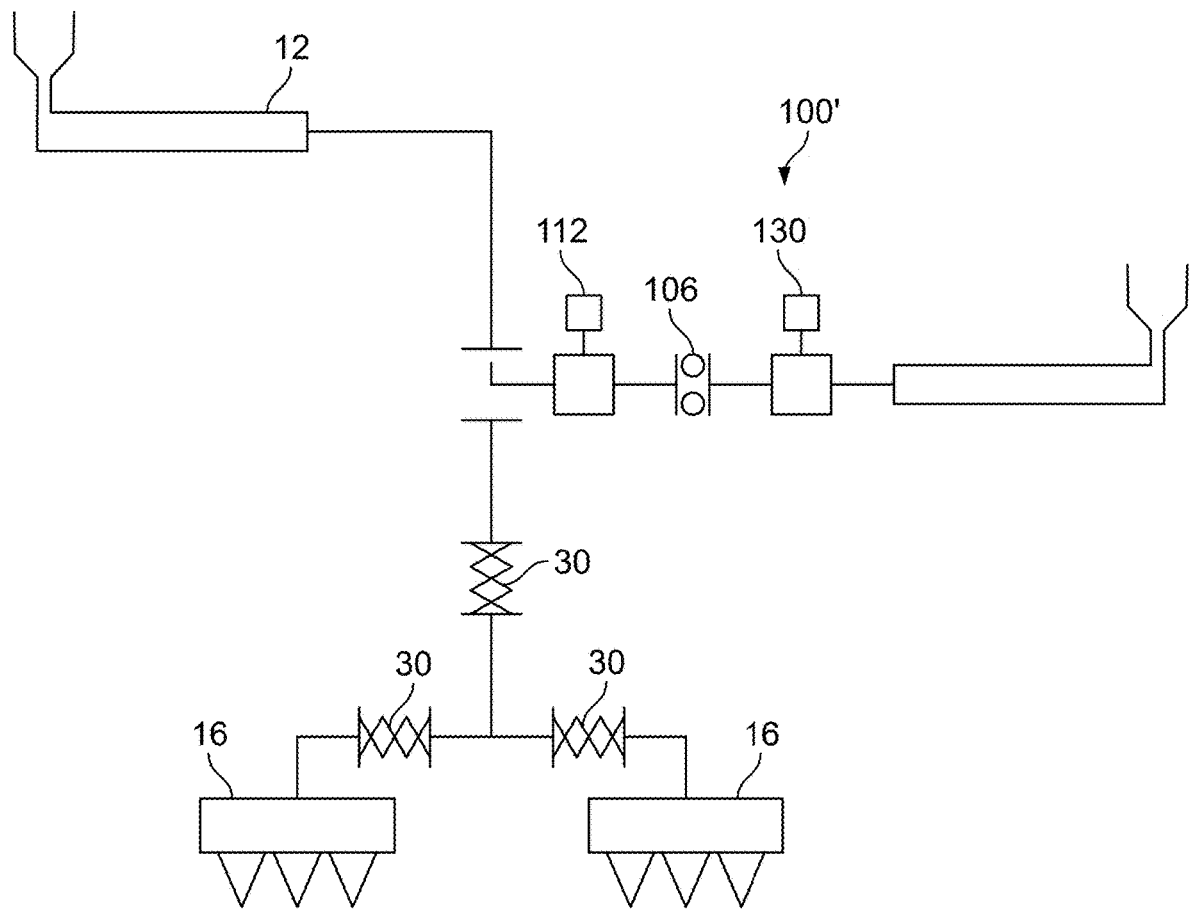
FIG. 26 illustrates a schematic of a system for colored yarn production in accordance with embodiments of the present disclosure.

Referring to FIG. 1, using the system 10, primary polymer melt can flow from the main extruder 12 or other primary polymer melt source to the spinneret manifolds 17 via the transfer lines 18. The side arm extruder assembly 100 can inject a first colored polymer melt concentrate into a transfer line 18 so that a mix of the primary polymer melt and the first colored polymer melt concentrate produces a first colored polymer melt. Optionally, with further reference to FIG. 26, one or more mixers 30 can further be positioned between the side arm extruder assembly 100 and the spinneret manifolds 17 for mixing the first colored polymer melt concentrate with the primary polymer melt. Fibers can then be produced from the first colored polymer melt via the spinnerets 16.

To initiate a color change, flow of the first colored polymer melt concentrate from the side arm extruder can be stopped, thereby halting the production of the first colored polymer melt. In some aspects, halting the production of the first colored polymer melt can comprise ceasing provision of the polymer of the first color into the downcomer. In further aspects, halting the production can include stopping the sidearm extruder 102 and melt pump 106. It is further contemplated that the extruder and melt pump do not stop during a color change. For example, in some aspects, the first (and second) diverter valve(s) can be moved to their respective purge positions, as further disclosed herein, while the extruder and melt pump remain on. In other aspects, the first (and second) diverter valve(s) can remain in production position(s) to purge the sidearm extruder assembly 100 into the transfer line 18.

The first colored polymer melt concentrate can then be purged from the side arm assembly 100/100'. For example, after stopping the side arm extruder 102 and the melt pump 106, the diverter valve or valves can be moved to their respective purging positions, and the extruder and pump can be restarted, thereby purging the first colored polymer through the one or more purge channel(s), as further disclosed herein. A second colored polymer melt concentrate can be introduced into the side arm extruder assembly 100/100'. The second colored polymer melt concentrate can be injected from the side arm extruder assembly 100/100' into the flowing primary polymer melt in the transfer lines 18. In some aspects, the color change can be performed in less than ninety minutes, less than sixty minutes, less than twenty minutes, or less than ten minutes. In further optional aspects, especially when the second polymer color is similar to the first polymer color, the first color concentrate can be purged into the transfer line 18. For example, the diverter valve(s) can be left in their production positions (FIGS. 3A, 7A, 27A), and all material during the transition from the first polymer concentrate to the second polymer concentrate can be injected into the primary polymer melt from the sidearm extruder assembly.

In some exemplary aspects of a color change, an operator can halt feeding the color concentrate polymer (e.g., pellets)

of the first color into the downcomer (e.g., manually or automatically by activating a purge sequence). For example, in some aspects, the operator can discontinue delivery of color concentrate polymer into the downcomer. In further aspects, an automatic feeder can cease delivery of color concentrate polymer into the downcomer. The first proximity switch 160 (FIG. 8) can detect that the color concentrate polymer has dropped below the threshold and, in response, send a signal to the computing device indicating that a purge cycle is beginning. The operator or a computer-automated feeding device can introduce the second color concentrate polymer into the side arm extruder assembly via the downcomer (or material bins). The second color can be added in one or more small batches (e.g., about 0.5-1.5 pounds at a time) to control the purge. In some aspects, after adding the batch second colored polymer, the purge cycle can be considered completed when the first proximity switch 160 (FIG. 8) detects that the polymer level has dropped below its detection threshold (and, optionally, upon termination of a timer of the computing device). For example, as disclosed in exemplary embodiments, when a purge resin is provided between two colors, purge resin is provided to the downcomer only for a predetermined duration as measured by the timer of the computing device (e.g., a programmable logic controller (PLC)). In this way, waste can be minimized.

In various optional aspects, the method for purging can be structured based on a classification system. In some aspects, the classification system can be associated with color change difficulty (e.g., easy/hard, easy/medium/hard, difficulty 1-4, etc.).

In some aspects, the classification color changes can be associated with a difference in one or more properties associated with the first and second polymer melt concentrate. For example, the difference in the one or more properties can comprise a difference between the first color and the second color (e.g., red to green) or the difference between the darkness of the first color and the second color (e.g., light brown to tan). As one example, each color darkness may be associated with a particular value (e.g., 1, 2, 3, 4, 5, or 6). Thus, a color change from color of a darkness value of 4 to a color darkness of 3 can be associated with a difficulty value of 1, which can be classified as easy, whereas a change from color of a darkness value of 6 to a color of a darkness value of 1 can correspond to a difficulty of 6, which can be classified as hard. Still further, the difficulty can be associated with the direction of a color change (e.g., dark to light vs. light to dark). In further aspects, the difficulty of color change can be a function of operator experience. For example, an operator can, based on experience, categorize the difficulty of the color change.

Each difficulty can be associated with a respective purge method. For example, an easy color change can have a first purge method, and a difficult color change can have a second purge method. In further aspects, a medium color change can have a third purge method. In some exemplary, optional aspects, the first purge method, associated with an easy color change, can purge directly into the transfer line 18. A medium difficulty color change can first purge through a diverter valve (e.g., the first diverter valve 130) and then purge into the main line for a first minimum duration. A hard color change can first purge through a first diverter valve and then purge into the main line for a second minimum duration that is longer than the first minimum duration.

Figure 6:
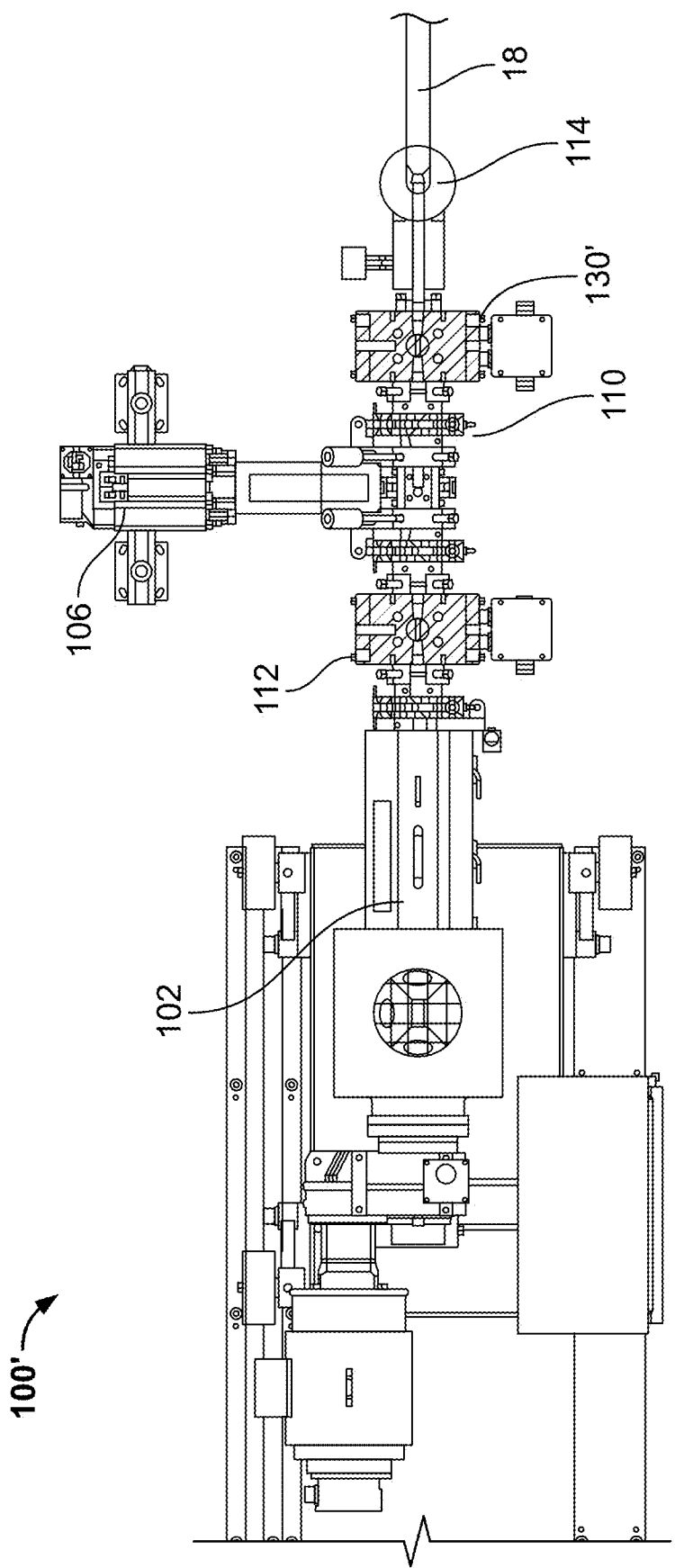
FIG. 6 is a side view of another side arm extruder assembly in accordance with embodiments disclosed herein.

In some aspects, the first colored polymer melt concentrate can be purged from the side arm extruder assembly (e.g., via the first diverter valve 130 or the first and second diverter valves 130', 112—FIG. 6). For example, in the side arm extruder assembly 100 embodiment shown in FIG. 2, the first diverter valve 130 can be moved to the second position, FIG. 3B, that enables purging.

Referring to FIG. 8, in order to minimize the time required to perform a color change, the sidearm extruder 100 (FIG. 1) can be fed (e.g., gravity-fed) via a downcomer 23 that is configured to maintain a small inventory (e.g., only a few pounds of colored polymer concentrate at a time). A blender delivery system can feed between one and two pounds into the downcomer any time color concentrate pellets are called for. For example, during production, the first proximity switch 160 (FIG. 8) can be used to trigger a dispensation of color concentrate polymer into the downcomer. That is, the first proximity switch 160 detecting an absence of polymer (when the polymer level falls below the first proximity switch) can trigger a request of color polymer concentrate (e.g., a signal to an automatic blender delivery system to begin dispensation or an indication to an operator to add polymer concentrate). The color concentrate polymer can be added (automatically or manually) until the downcomer 23 is filled to a level at which the second proximity switch 162 detects polymer, at which point, addition of color concentrate polymer can be halted. In this way, a small quantity of inventory can be held in the downcomer, thereby minimizing moisture regain. Still further, the small quantity of inventory held in the downcomer 23 can reduce the amount of polymer that requires purging from the sidearm extruder 100 during a color change. For example, the maximum volume of inventory that can be held in the downcomer before triggering the second proximity switch 162 can be, for example, less than 1,000 cubic centimeters, less than 5,000 cubic centimeters, or less than 10,000 cubic centimeters. A feed tube (e.g., a feed tube having a square cross section as in FIG. 8) just over the extruder throat can also be small to minimize inventory. The third proximity switch 164 can indicate to the system that the downcomer is over-filled, indicating a possible problem and triggering an alarm.

Figures 3A, 3B, 3C:
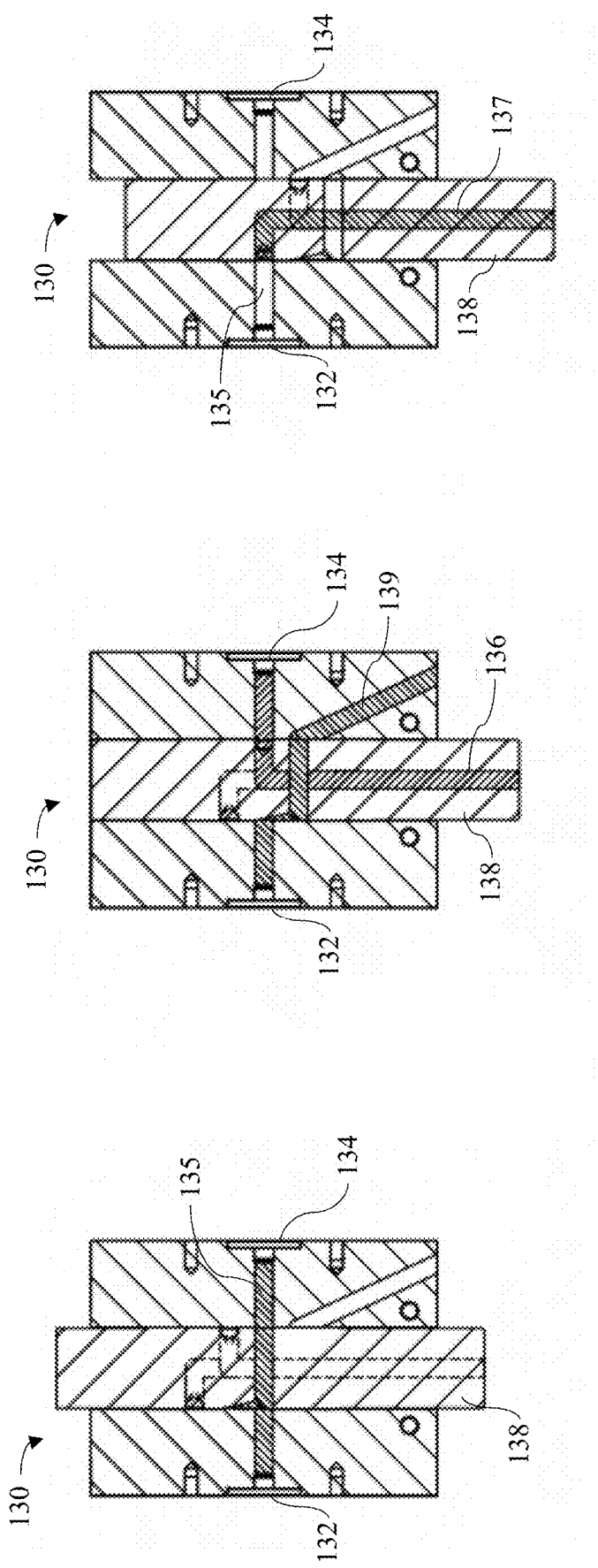
FIG. 3A is a cross section of a first diverter valve of the side arm extruder assembly as in FIG. 2 in a first position.
FIG. 3B is a cross section of the first diverter valve in a second position.
FIG. 3C is a cross section of the first diverter valve in a third position.

In some exemplary aspects, the first diverter valve 130 can be moved to its third position (FIG. 3C). The extruder can push the first (old) colored resin out of the first diverter valve 130, thereby purging the first colored polymer melt concentrate from the side arm extruder assembly 100. No purging of the mixing union would be accomplished in this position.

Figure 7:
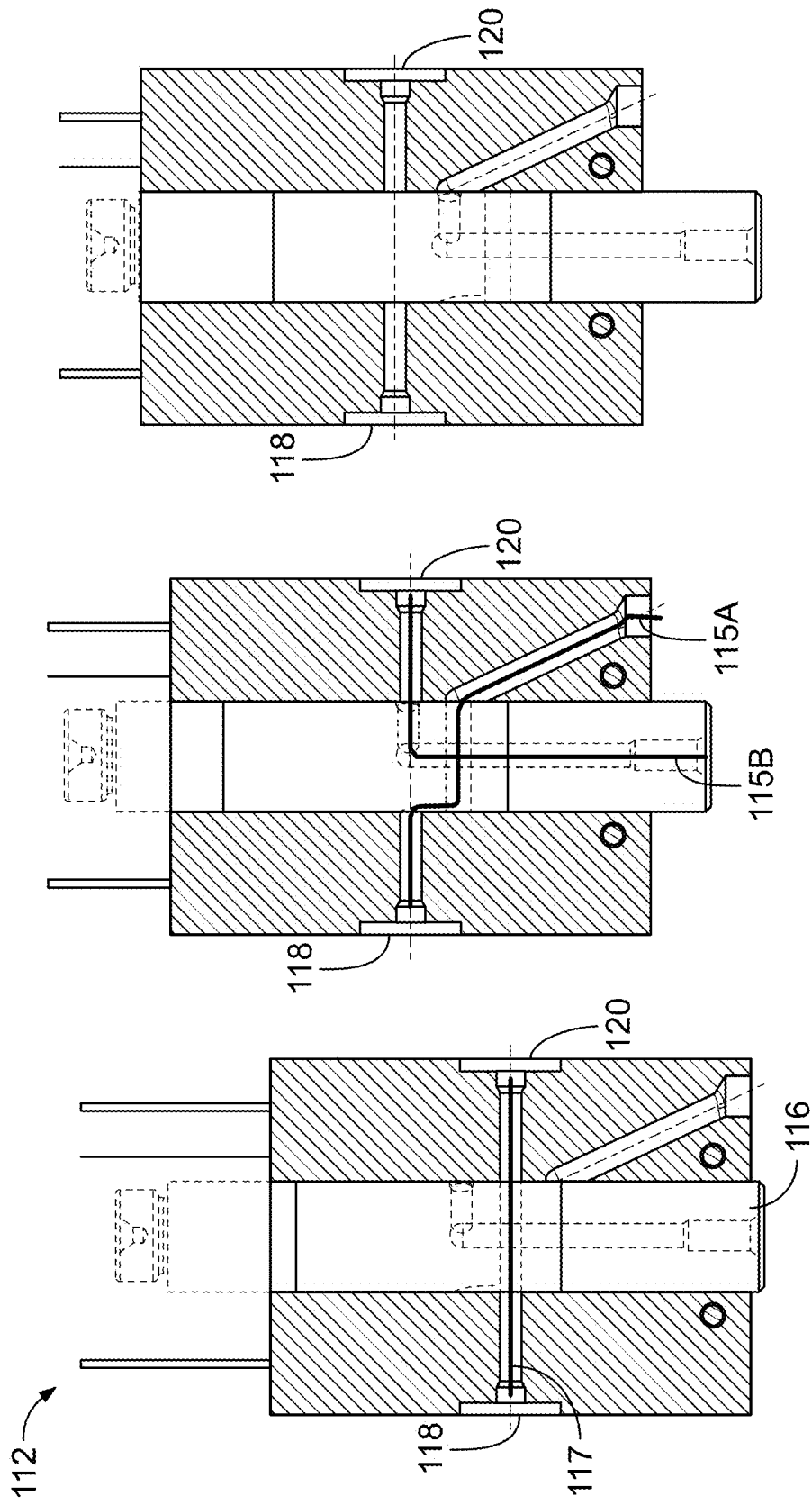
FIG. 7A is a sectional view of a second diverter valve of the side arm extruder assembly as in FIG. 6 in a first position.
FIG. 7B is a sectional view of the second diverter valve of the side arm extruder in a second position.
FIG. 7C is a sectional view of the second diverter valve of the side arm extruder in a third position.

Referring to FIGS. 6 and 7A-7C, for embodiments having a second diverter valve 112 (e.g., the side arm extruder assembly 100' of FIG. 6), the second diverter valve 112 can be switched to its second position (FIG. 7B). With the first diverter valve 130' in the first position (FIG. 27A), the melt pump 106 can be run in reverse to pull primary polymer melt from the transfer line 18, through the first diverter valve 130', and pump it out the second purge channel 115B of the second diverter valve 112. Optionally, the melt pump 106 can be run at a higher rpm in the purge mode than in a normal production run. The extruder 102 can push first colored polymer melt concentrate through the first purge channel 115A of the second diverter valve 112.

Once the first color is sufficiently purged from the side arm extruder assembly, the melt pump 106 and extruder 102 of the sidearm assembly can be stopped. The side arm extruder assembly can then be set up to inject the second colored polymer melt concentrate into the flowing primary polymer melt. For example, the first diverter valve 130' can be set in the first (production) position (FIG. 27A). For embodiments with a second diverter valve 112, the second diverter valve 112 can likewise be set in the first (production) position (FIG. 7A). The melt pump 106 can be restarted and run in the normal production direction. The extruder 102 can similarly be restarted. The colored yarn polymer concentrate of the second color can flow into the primary polymer melt at the desired ratio to produce yarn having the desired color. The melt pump 106 can be sped up or slowed down to achieve the desired let down ratio.

In further optional aspects, before introducing the second color concentrate polymer into the downcomer, a purge resin can first be added to the downcomer. The purge resin can be particularly beneficial when the first and second colors are substantially different. The purge resin can be pumped through the purge channel(s) or out the outlet 101 (FIG. 4) of the side arm extruder assembly in the same manner as the second color concentrate polymer.

Although exemplary embodiments provided in the present disclosure are directed to making colored yarn, it should be understood that aspects of the present disclosure can be applied in making other products without departing from the scope or spirit of this disclosure. For example, the polymer melt comprising the primary polymer melt and the polymer from the sidearm extruder assembly can be provided to, instead of a spinneret, various other product forming devices to make, for example, pellets (e.g., compounded pellets), films, sheets, injection-molded articles, or blown polymer articles. Accordingly, in various aspects, the product forming device can be one of an injection mold, a blow mold, a pelletizer, a film die, a pipe die, a profile die, a thermoforming die, or an extruder.

Further, aspects of this disclosure can be applied to manufacture of wet-spun polymer products. For example, a primary polymer solution that is pumped through a transfer line 18 can receive a coloring agent injected therein prior to release of the mixed solution (comprising the primary polymer solution and coloring agent) into a hot air oven or coalescing bath. Additionally, one or more diverter valves can be provided to purge the coloring agent instead of injecting the coloring agent into the primary polymer solution.

Color Measurement

Figure 9:
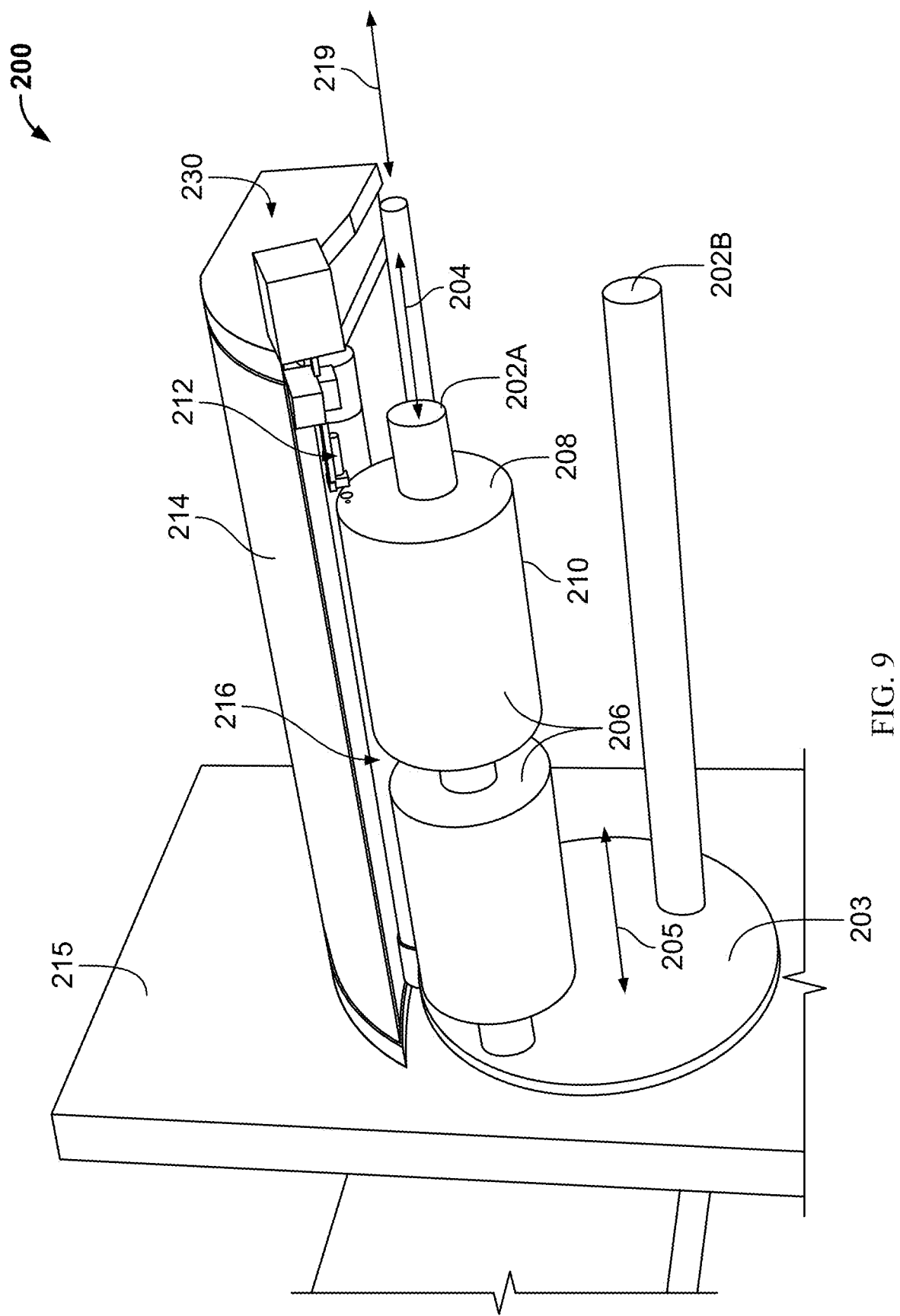
FIG. 9 is a perspective view of a winder in accordance with embodiments disclosed herein.
Figure 10:
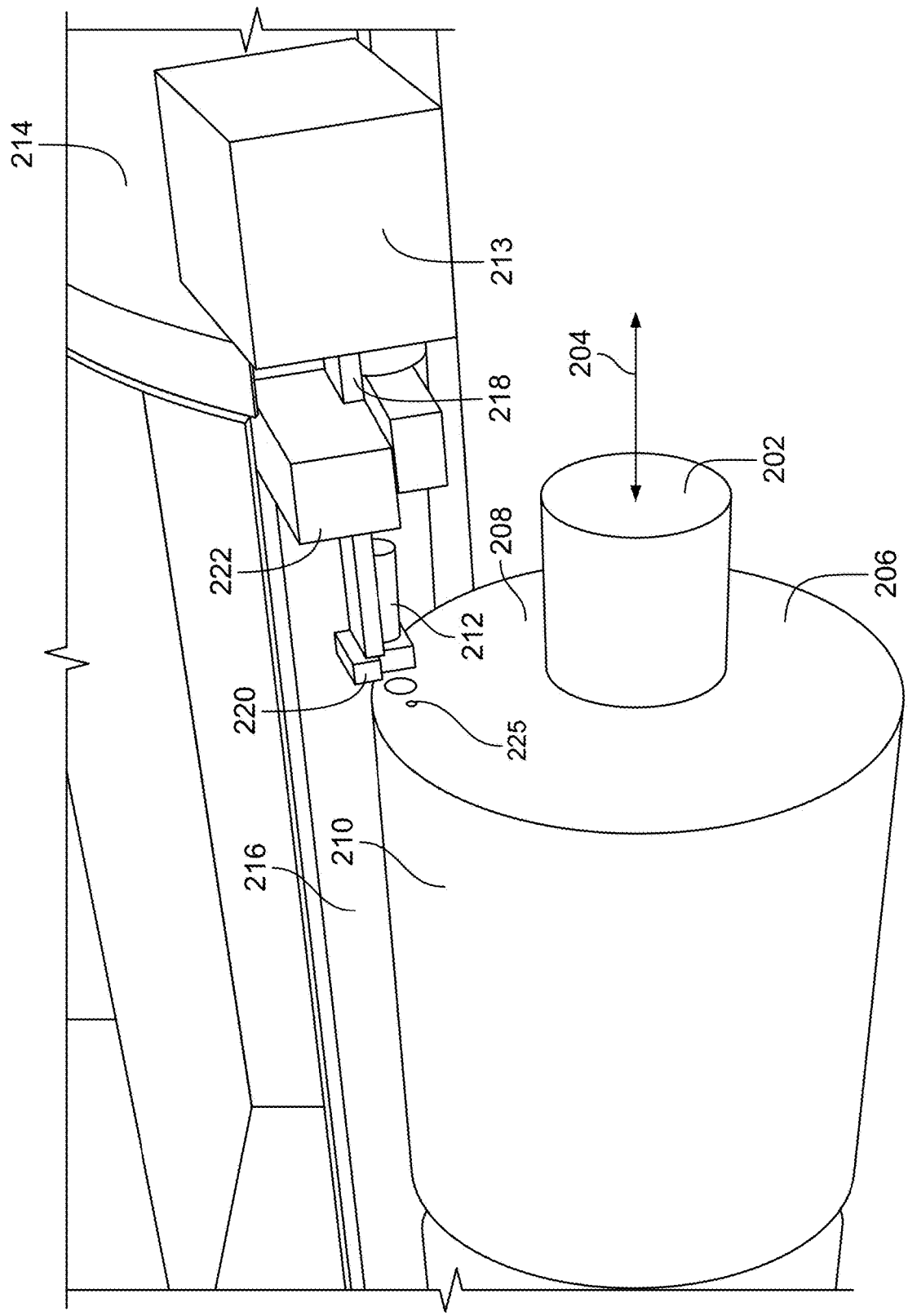
FIG. 10 is a partial close up perspective view of the winder of FIG. 9.
Figure 11:
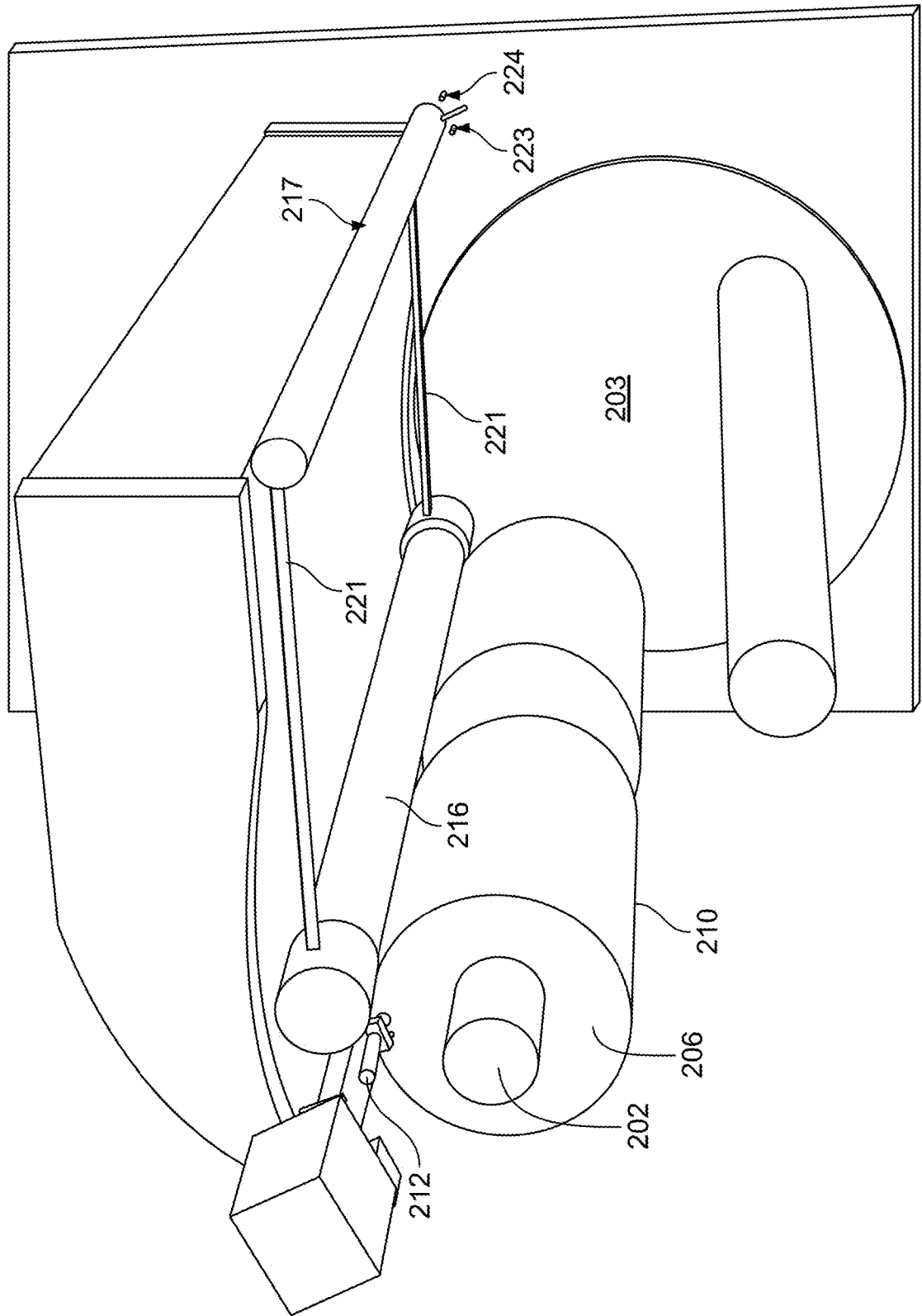
FIG. 11 is another partial close up perspective view of the winder of FIG. 9.

Referring to FIGS. 9-11, in some aspects, the system 10 can comprise a winder 200. In some optional aspects, the winder 200 can be an auto doffing winder. A panel can comprise electronic components for controlling operation of the winder 200. The winder 200 can comprise a spindle 202 that is configured to be driven about a spindle axis 204. The winder 200 can be configured to wind a yarn package 206 on the spindle 202 so that the yarn package has a longitudinal end 208 and a circumferential surface 210. The yarn package 206 can be, for example, cylindrical or conical. The yarn package 206 can have a diameter defined as a maximum radial distance between opposing sides of the outer circumference 210 of the yarn package. The winder 200 can further comprise a winder head 214 that is coupled to a frame 215. The winder 200 can comprise an engagement surface 216 that is configured to rest on, and bias against, the yarn package as it is wound on the spindle (e.g., against the circumferential surface 210 of the yarn package 206). In some optional aspects, the engagement surface 216 can be a driven friction roller biased against the yarn package and rotating at a constant speed to cause the yarn to wind at a constant linear speed irrespective of the diameter of the yarn package. In further optional aspects, a motor can rotate the spindle 202, and the engagement surface 216 can be an idler roller that is configured to rotate with the yarn package and measure its surface speed.

In some aspects, the winder 200 can comprise a first spindle 202A and a second spindle 202B that are coupled to a turntable 203 that rotates about a rotational axis 205. Accordingly, the first and second spindles 202A,B can rotate about the rotational axis 205 as the turntable rotates. A stepper motor can selectively cause the turntable 203 to rotate about the rotational axis 205 of the turntable 203. The engagement surface 216 can be pivotally connected to an engagement surface pivot shaft 217 via at least one scanner roll connecting arm 221 so that, as the yarn package increases in diameter (as yarn is wound therearound), the engagement surface can pivot upwardly (clockwise in FIG. 9) about a pivot axis 219, the axis of the pivot shaft 217. The winder 200 can comprise a first limit switch 223 (FIG. 11) that is triggered when the engagement surface 216 pivots upwardly beyond a threshold. When the first limit switch 223 is triggered, the turntable 203 can rotate to move the spindle downwardly (counterclockwise in FIG. 9), thereby lowering the engagement surface 216 until a second limit switch 224 is triggered, causing the turntable 203 to cease rotation. In this way, the circumferential surface 210 of the yarn package 206 (along the area that biases against the engagement surface 216) can be maintained at a select position (within maximum and minimum spacing thresholds) of the winder head 214. That is, a portion of the circumferential surface 210 (e.g., a portion that biases against the engagement surface 216) can be maintained within a first boundary 302 (at which the turntable 203 begins to rotate) and a second boundary 304 (at which the turntable 203 ceases rotation).

The winder 200 can further comprise a color probe 212 that is configured to continuously or intermittently (e.g., every second, every five seconds, etc.) measure the color of the yarn wound around the spindle. In this way, the color of the yarn can be numerically assessed. For example, $\Delta E$ (or $\Delta E_{CMC}$) is the typical metric used to assess a color measurement vs. its color standard, as $\Delta E$ incorporates all aspects of color, such as value (lightness/darkness), hue, and chroma. However, other color values (or deltas), which are each components of $\Delta E$, can be used as indicators. For instance, $\Delta L^*$ (or $\Delta L_{CMC}$) indicates the closeness of a color by assessing the lightness or darkness of the sample vs. the color standard. In further aspects, other color metrics, such as, for example, $\Delta a^*$, $\Delta b^*$, $\Delta C^*$, $\Delta H^o$, or, optionally, the sample color values: $L^*$, $L_{CMC}$, $a^*$, $b^*$, $C^*$, or $H^o$, or any other suitable color metric, can be used as an indication of the nearness of a sample's color to the defined standard. Accordingly, the color probe can be selected based upon the desired measured color metric. Knowing that the $\Delta$[value] (e.g., $\Delta a^*$, $\Delta b^*$, $\Delta E_{CMC}$, $\Delta E$, $\Delta C^*$, $\Delta H_0$) corresponds to a difference between a measured value and a desired specification value, then, in some aspects, once the desired color is achieved (e.g., when the measured color value is within a select threshold of the desired specification value), a computing device in communication with the color probe 212 can provide an indication (e.g., alarm or notification) that a production run can begin. Optionally, the yarn that was formed prior to achieving the desired color can be doffed automatically, and the production run can begin.

A controller or other computing device (e.g., computing device 1001) can be configured to receive a color measurement from the color probe 212, compare the color measurement from the color probe to a specification, and, in response to determining that the color measurement is outside of a predetermined tolerance of the predetermined specification, provide an output. For example, the controller can send an alarm to an operator, automatically adjust the letdown at the melt pump, or doff the yarn package 206 off the winder 200 (that is, reject the off-specification package). In further aspects, it is contemplated that measuring the yarn color on the winder 200 can reduce waste during color changes. For example, the end of production of the first color and beginning of production of the second color can be quickly identified. Further, measuring the yarn color on the winder 200 can detect failures such as color drifting off specification, which may indicate, for example, that the yarn is improperly tensioned or the feed rate of the color concentrate is wrong.

The winder 200 can be configured to maintain the position of the color probe 212 at a select position with respect to the yarn package 206. For example, the color probe can be maintained at a select distance (clearance) from the longitudinal end 208 of the yarn package 206. It is contemplated that the color probe 212 can have an optimal measurement distance (clearance) from the surface of the longitudinal end 208 of the yarn package 206 for accurately measuring the color of the yarn on the yarn package. In some embodiments, said optimal measurement distance can be, for example, less than 50 mm, less than 20 mm, less than 15 mm, less than 10 mm, less than 5 mm, between 5 mm and 50 mm, between 5 mm and 20 mm, or between 10 mm and 20 mm. In some optional aspects, the color probe 212 can be coupled to the winder head 214 via a mounting bracket 213 (FIG. 10). A rail 218 can couple to the mounting bracket 213. The rail 218 can be elongate and can extend parallel to, or generally parallel to, the spindle axis 204. That is, the rail 218 can be elongate along an axis that is parallel to, or generally parallel to, the spindle axis 204. The color probe 212 can movably couple to the rail 218 in order to position the color probe 212 at a select spacing from the yarn package along the spindle axis 204. For example, the color probe 212 can couple to a carriage that is movable along the rail 218, and a motor (e.g., a stepper motor) can move the carriage along the rail. A range sensor 220 (e.g., a laser range sensor) can couple to the rail 218 in a configuration so that the range sensor 220 can measure a distance to the longitudinal end 208 of the yarn package 206. In some optional aspects, the range sensor 220 can couple to the rail 218 at a fixed position along the length of the rail. In further optional aspects, the range sensor 220 can couple to the carriage so that the range sensor 220 moves along the rail 218 with the color probe 212. Optionally, the winder 200 can comprise a controller that is operative to receive a distance measurement from the range sensor 220, and based on the distance measurement, cause the stepper motor to move the color probe 212 along the rail to adjust the spacing from the color probe to the longitudinal end of the yarn package.

In further aspects, and as illustrated in FIGS. 9-11, the color probe 212 and range sensor 220 can be fixedly coupled to the rail 218. A motor 222 (e.g., a stepper motor) can couple to the winder head 214 and can move the rail 218 along its longitudinal axis to position the color probe 212 with respect to the yarn package. The distance measurement of the range sensor 220 can be used to determine the position of the color probe 212 with respect to the longitudinal end 208 of the yarn package 206. Based on the distance measurement from the range sensor 220, the motor 222 can move the color probe 212 along the axis of the rail 218 to position the color probe 212 at a select offset (clearance) from the longitudinal end 208 of the yarn package 206 relative to the spindle axis 204. Optionally, the winder 200 can comprise a controller that is operative to receive a distance measurement from the range sensor, and based on the distance measurement, cause the stepper motor to move the rail to adjust the spacing from the color probe to the longitudinal end of the yarn package.

In further optional aspects, the range sensor 220 can be a proximity switch. In still further optional aspects, the range sensor 220 can comprise a compressed gas source that ejects compressed gas out a nozzle. A proximity of the yarn package to the nozzle's outlet can cause a back pressure at the nozzle, and a pressure sensor can measure said back pressure to detect the proximity of (and, optionally, a distance to) the yarn package.

Figure 28:
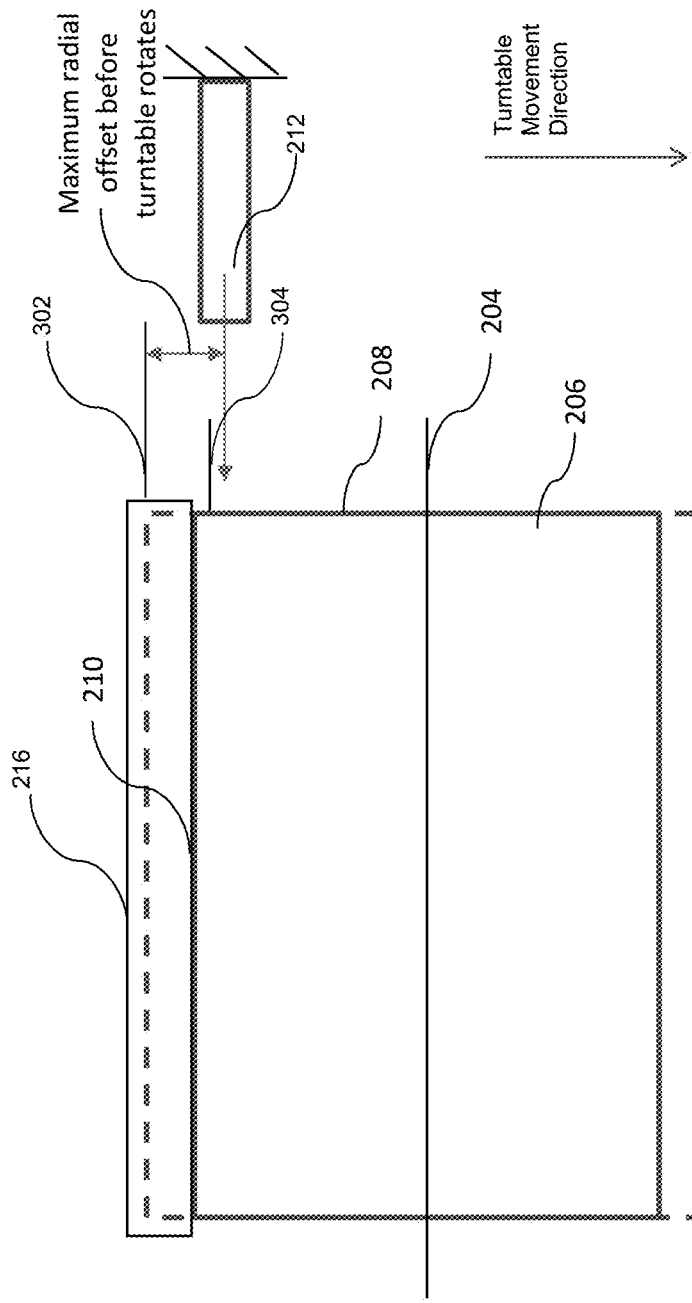
FIG. 28 is a schematic illustrating measurement of the color of a yarn package.

In addition to maintaining the color probe 212 at a select distance (clearance) from the longitudinal end 208 of the yarn package 206, the color probe can be positioned to measure an area 225 on the longitudinal end 208 of the yarn package 206 that is within a select radial offset from the circumferential surface 210 of the yarn package. It is contemplated that yarn most proximate to the outer circumference of the yarn package corresponds to the yarn most recently wound on the yarn package. Thus, in order to minimize the time delay between yarn leaving the spinneret and its color being measured at the winder 200, the color probe 212 can be positioned to measure an outer radial-most portion of the yarn package. As stated herein, the engagement surface 216 of the winder 200 rests against the yarn package 206 as it winds. Optionally, color probe 212 can be coupled to the scanner roll connecting arm 221 so that the color probe, likewise, maintains a fixed spatial relationship (e.g., radial offset) with respect to the circumferential surface 210 of the yarn package 206. Said fixed spatial relationship can be a fixed radial offset (e.g., between 1 millimeters and 30 millimeters, or between 3 millimeters and 30 millimeters, or between 5 millimeters and 30 millimeters) from the circumferential surface 210 against which the engagement surface 216 biases. In further aspects, the color probe 212 can be coupled to a fixed frame member 230 on the winder 200. Referring also to FIG. 28, as stated herein, because the turntable 203 rotates upon the pivotal movement of the engagement surface 216 after only small incremental increases in the radius of the yarn package, the portion of the circumferential surface 210 of the yarn package 206 that biases against the engagement surface 216 is maintained at a select radial offset from the color probe 212, within maximum and minimum thresholds. Thus, the color probe 212 can be positioned near the circumferential surface 210 of the yarn package 206 that the engagement surface 216 biases against. In this way, the measured area 225 of the color probe 212 can be maintained within a select radial offset of the circumferential surface 210. That is, after the yarn package increases by the amount at which point the first limit switch 223 of the winder head 214 is triggered to cause the turntable 203 to rotate, the measured area 225 of the color probe 212 can be positioned at a maximum radial offset from the circumferential surface of the yarn package 206, and the turntable 203 can rotate to move the yarn package 206 so that the circumferential surface of the yarn package is less than the maximum radial offset from the color probe 212. Just after the turntable 203 ceases rotation, the measured area 225 of the color probe 212 can be at a minimum offset from the circumferential surface 210. In some optional aspects, the radial offset can be less than thirty millimeters, less than twenty millimeters, less than ten millimeters, less than five millimeters, or less than two millimeters (e.g., between one millimeters and one hundred millimeters, or between three millimeters and thirty millimeters, or between five millimeters and fifty millimeters).

In further optional aspects, the color probe 212 can be configured to measure the color for yarn on the circumferential surface 210 of the yarn package 206. Accordingly, in some optional aspects, the color probe 212 can be perpendicular to, or generally perpendicular to, the spindle axis 204. It is contemplated, however, that the texture of the yarn on the circumferential surface can, in some situations, affect the detected yarn color.

The color probe 212 can further have an optimal measurement angle that corresponds with a measurement with a greatest degree of accuracy. For example, the color probe 212 can have a measuring direction that is within thirty degrees of parallel to, or within fifteen degrees of parallel to, or within ten degrees of parallel to, within five degrees of parallel to, or substantially parallel to, or parallel to the spindle axis 204, or normal to, or substantially normal to, the longitudinal end 208 of the yarn package 206.

The color probe 212 can be in communication with a computing device (e.g., computing device 1001, as further disclosed herein). The computing device can be configured to control at least one parameter associated with the color of the yarn. For example, the computing device can be configured to change a rate at which colored polymer is introduced into the manufacturing system. The computing device can, for example, change a speed of the melt pump 106 (see FIGS. 2 and 6), thus regulating the rate of color concentrate injected at the outlet 101 (FIG. 4), and, thereby, changing the concentration of the colored polymer within the manufacturing system and, thus, the color of the yarn produced by the manufacturing system.

In various aspects, a method can comprise obtaining a yarn color measurement of yarn wound on a yarn package 206 as the yarn package is being wound. Optionally, the yarn color measurement is taken from the longitudinal end 208 of the yarn package 206. For example, the yarn color measurement can be taken by the color probe 212 on the winder 200. In various aspects, the distance of the color probe 212 from the longitudinal end 208 of the yarn package 206 can be adjusted (e.g., by moving the color probe relative to the yarn package based on a measurement of the distance from the color probe to the yarn package). The method can further comprise maintaining the color probe 212 within a predetermined distance of the outer circumferential surface 210 of the yarn package 206. In further optional aspects, the yarn color measurement can be taken on the outer circumferential surface of the yarn package.

The method can further comprise determining whether the yarn color measurement is within a threshold of a specification, and, upon determining that the yarn color measurement is within the threshold of the specification, causing an event. In some effects, the event can comprise doffing the yarn package (optionally, automatically doffing) immediately after, or after a predetermined time following, a determination that the yarn color measurement is within the threshold of the specification. In further aspects, the event can comprise providing an indication (e.g., an audible alarm or a visual alarm). Said indication can inform an operator that the operator should perform an action, such as causing the winder 200 to doff or prepare a system for a production run. In various aspects, some or all of the steps of the methods disclosed herein can be performed automatically (e.g., using a computing device as disclosed herein) or by actions of an operator.

Figure 25:
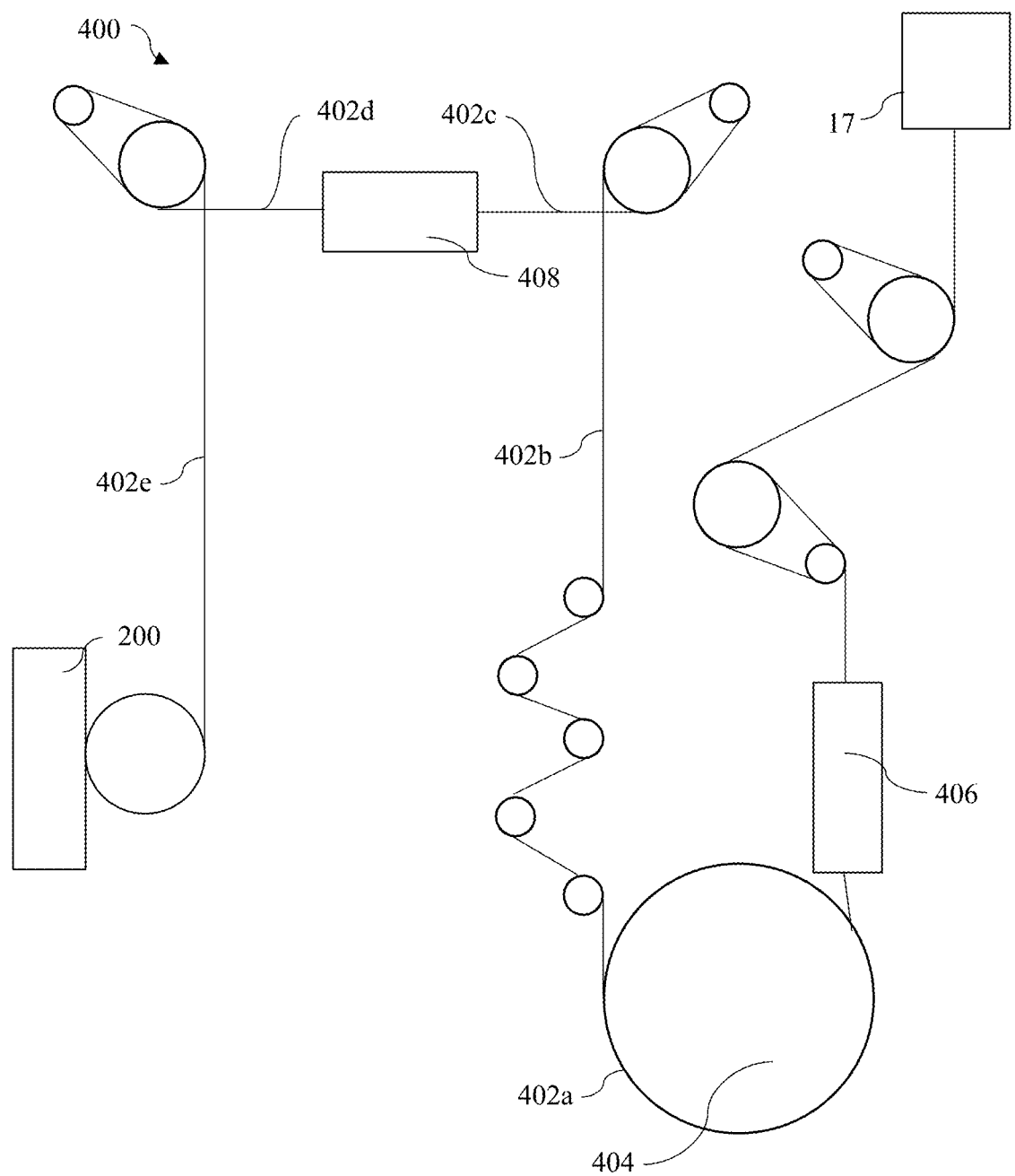
FIG. 25 is a schematic diagram of a draw-texturizing panel and winder, illustrating optional locations for locating a color probe.

In further aspects, it is contemplated that the color probe 212 (FIG. 11) can be positioned anywhere along the path of the yarn from the spinneret manifold 17 (FIG. 1) to the winder 200. FIG. 25 illustrates a draw-texturizing panel 400 that is conventionally used in carpet yarn manufacturing. The draw texturizing panel 400 can define a yarn path 401 (or fiber line) along which the yarn passes from the spinneret manifold (or spinneret) to the winder 200. The draw-texturizing panel 400 can comprise a cooling drum 404, pre-draw duos, draw duos, a texturizing box or other texturizer 406, a tack box 408, and tack jet rolls. Color probe positions 402a-e indicate optional exemplary positions where the color probe can be positioned, although other suitable positions are contemplated. For example, the color probe position 402a indicates a position at which the color probe 212 measures the yarn color on the cooling drum 404. The color probe positions 402b,c indicate optional positions between the cooling drum 404 and the tack box 408 (before or after a godet). The color probe positions 402d,e indicate optional positions between the tack box 408 and the winder 200 (before or after a godet). In some aspects, it can be desirable to position the color probe 212 at a location along the yarn path after the cooling drum 404, as the yarn has substantially attained its final denier and it has been texturized, so the measured color is consistent with the color of the yarn in its final form. However, in further aspects, the color probe 212 can be positioned at any other location along the yarn path, before or after the cooling drum 404. In some optional aspects, the color probe 212 can be configured to measure the color at any point at which the yarn is fully drawn, such that the color is not over-saturated due to the yarn not achieving its final denier.

Exemplary Yarn Color Changes

Exemplary yarn color changes have been performed to confirm efficacy of the systems and methods disclosed herein. For an exemplary yarn color change test, using the weight of a yarn package and the time required to form the entire yarn package, fractions of the yarn (e.g., every 100 grams) aspirated from the yarn package can correspond to respective time increments of the entire time required to form the yarn package. For example, an eleven pound package collected in fifteen minutes can be divided into 0.224 pound increments, equivalent to about twenty second increments, with respective increments toward the inside of the yarn package corresponding to yarn produced at earlier times. Card wraps were wound at each 20 second increment and their colors measured in the lab on a color spectrophotometer, with the $\Delta E_{CMC}$ recorded for each measurement (referred to as DE in the following discussion). Six exemplary yarn changes discussed herein were performed on a pilot line comprising a system in accordance with that shown in FIG. 6. Each of these six exemplary yarn changes were "easy" changes, transitioning from dark brown to light tan. The exemplary yarn changes are considered easy, because the Old Color is readily purged by the New Color.

Figure 12A:
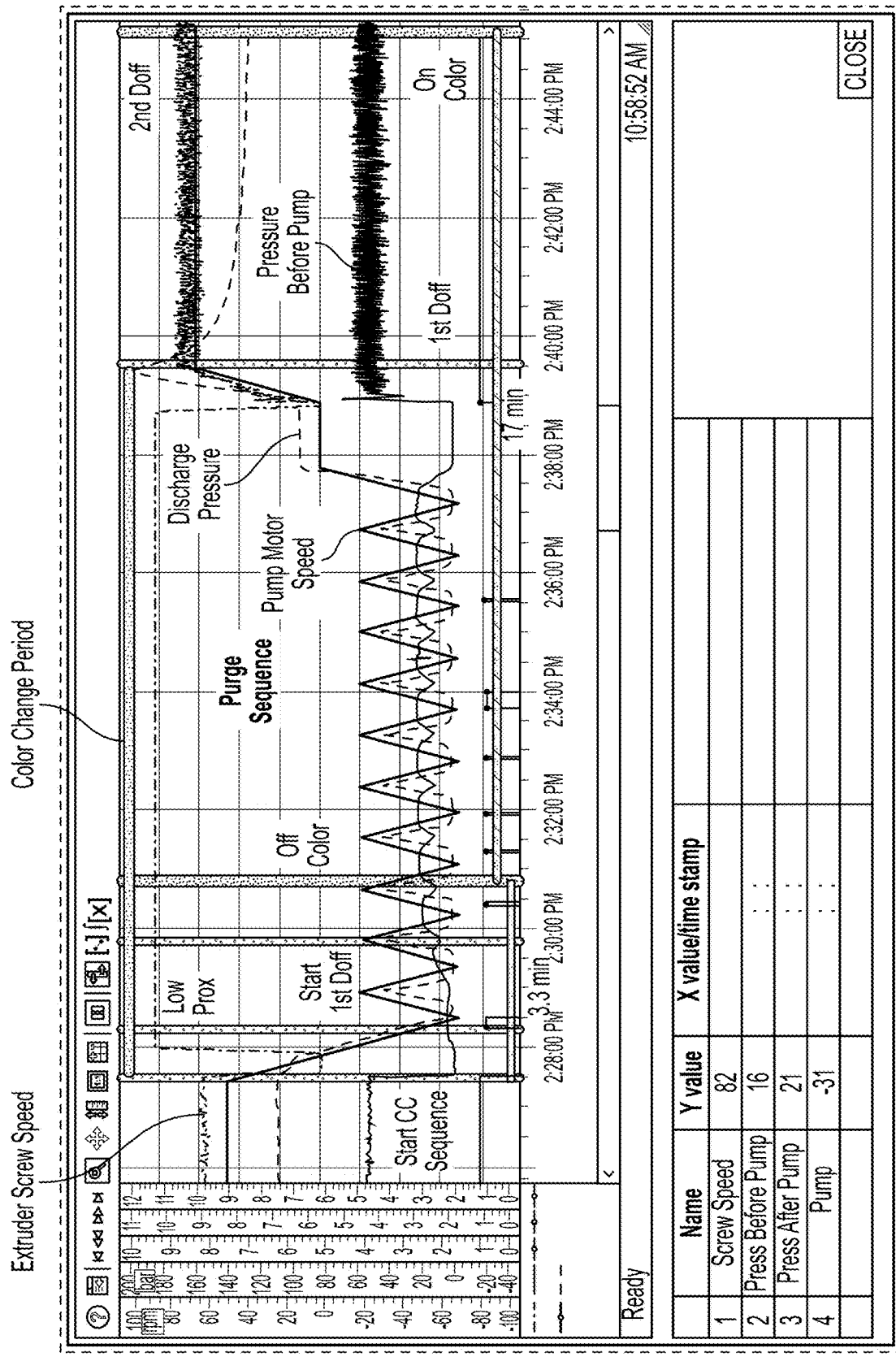
FIG. 12A illustrates a time series plot of instrumentation for a first exemplary yarn color change run.

With further reference to FIG. 6, FIG. 12A illustrates a time series plot for a first exemplary yarn color change run. The vertical axes, from left to right, are speed in RPM (for the extruder and pump) and pressure in bar (for the inlet and discharge of the melt pump). For the melt pump only, the numbers below zero on the RPM axis represent the melt pump rotating in the opposite direction, such that the pump was pulling melt from its discharge port and exhausting the melt through its inlet port.

The following steps were taken:
1. At 2:25 PM, the color was pulled from the Side Arm ("SA") Extruder blender, and the color was allowed to run out.
2. At 2:27 PM, the extruder and Melt Pump were shut down briefly (see fall of the top two traces to zero) to allow the second diverter valve 112 to move from the Production to the Purge Position (see FIG. 7B). The first diverter valve 130' was left in Production Position (see FIG. 27A).

A. As soon as the second diverter valve 112 was repositioned, the extruder and melt pump were turned back on.
3. When the Old Color concentrate ran below the first proximity switch 160 in the side arm (SA) Extruder downcomer (FIG. 8), around 2:29 PM, Virgin PET resin was dumped into the extruder downcomer to begin purging the Old Color concentrate out of the extruder.
NOTE: The time at which the Old Color concentrate fell below the first proximity switch 160 is defined as Time Zero for the Color Change, so Time Zero for this trial was 2:29 PM (labeled "Low Prox" in FIG. 12A).
4. This purge was maintained for five minutes (until 2:33 PM), then the Virgin PET level was shut off, and a short time period elapsed until the Virgin PET dropped below the first proximity switch 160.
5. At that point, the New Color concentrate was charged to the extruder hopper (downcomer), and purging of the new color through the extruder continued until 2:39 PM (another five minute purge).
6. Meanwhile, at the same time, the Melt Pump was also purging.
A. At 2:28 PM, the Melt Pump direction was reversed, and the pump began rotating in the opposite direction (see the Motor Speed Trace decelerate to zero, then begin to rotate in the opposite, or (−) direction). With this rotation, the melt pump began pulling natural PET melt from the Main Polymer line backwards through the mixing union (see FIGS. 4-5), through the first diverter valve 130', through the Melt Pump, discharging as purge waste through the second purge path 115B in the second diverter valve 112 (see FIG. 7B).
B. Looking at the Melt Pump RPM between 2:28 PM and 2:37 PM, a saw-tooth pattern in the RPM can be observed, i.e., the RPM oscillated from slow to fast to slow in a continuous saw-tooth pattern. This is referred to as "Disco" purging and is one technique used to accelerate purging vs. running at a steady RPM.
7. At 2:37:30, the Melt Pump was turned off and waited for the Extruder to finish its purge at 2:39 PM.
8. At 2:39, the extruder was turned off to allow the second diverter valve 112 to return to the Production Position (FIG. 7A), then the Extruder and Melt Pump were both started at the same time, with the Melt Pump now turning in the normal direction for Production mode. The New Color concentrate then began moving through the mixing union and downstream to the Fiber Line.

It should be noted that, during this purge procedure of the SA Extruder and associated equipment, natural PET Melt from the Main Pilot Line Extruder continued to flow through the spin beam, purging the Old Color out of the spin beam and spin packs.

Figure 12B:
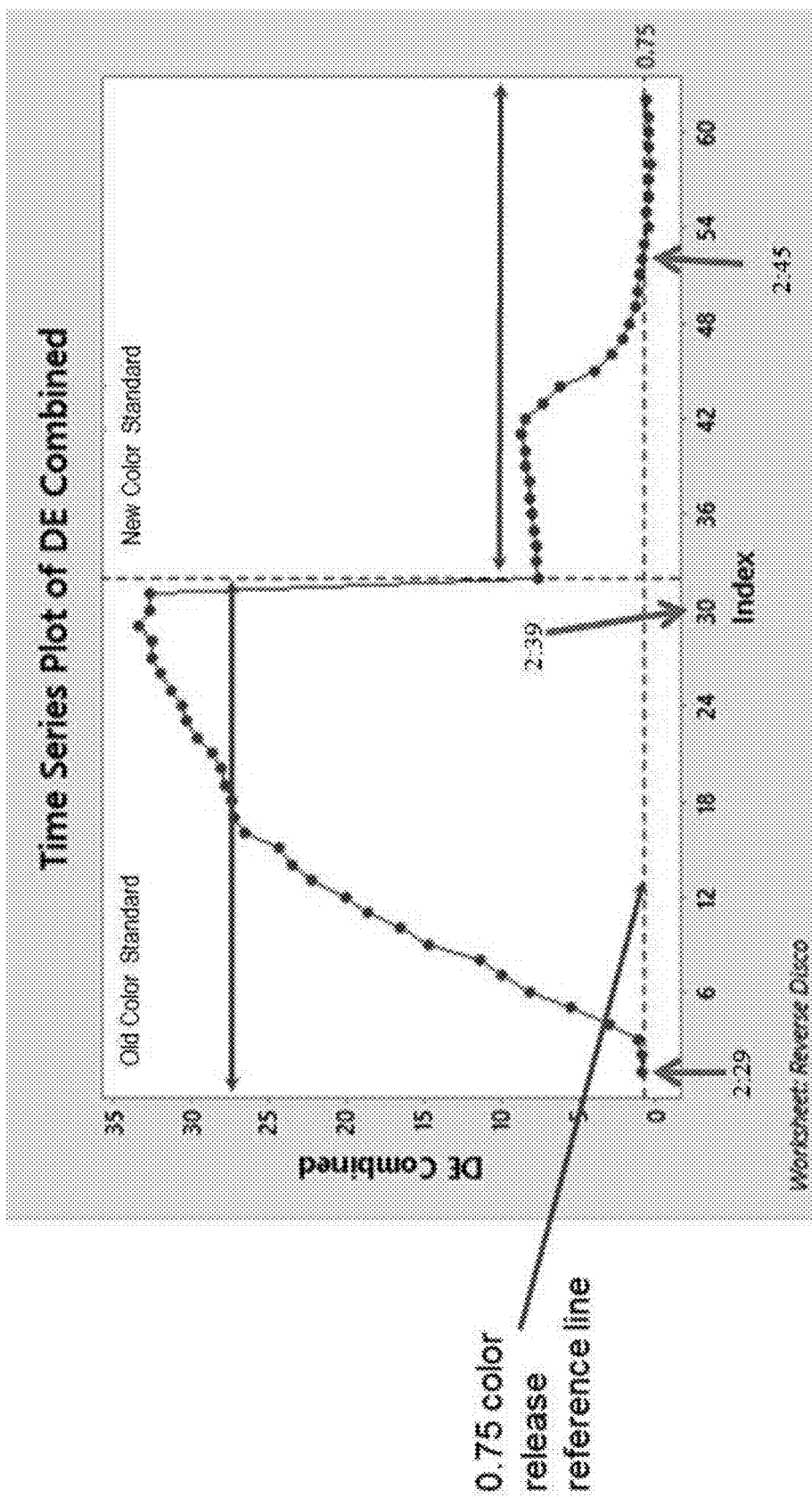
FIG. 12B illustrates a time series plot of the color of the yarn produced on the winder over time for the first exemplary yarn color change run.

FIG. 12B illustrates the color of the yarn produced on the winder over time for the first exemplary yarn color change run. Prior to Time Zero (2:29 PM), the plant stopped feeding Old Color concentrate to the extruder. Then, the extruder was briefly shut down to switch the second diverter valve 112 to the Purge Position. The extruder was re-started, and the color change Time Zero was defined as the point when the Old Color fell below the first proximity switch 160. Note that, within 60 seconds, the DE ($\Delta E_{CMC}$) began to increase as Virgin PET was coming through the Spin Beam, diluting the color. After ten minutes, the SA Extruder purging was complete, and the New Color concentrate began injecting into the Spin Beam. 2:39 PM is noted on FIG. 12B. At this point, the winder was doffed, and the yarn color in the new package was compared against the New Color Standard. Within 6.7 minutes, the color came into spec at a DE of 0.75. This was approximately 2:45 PM, giving a total changeover time of 16 minutes.

Figure 13A:
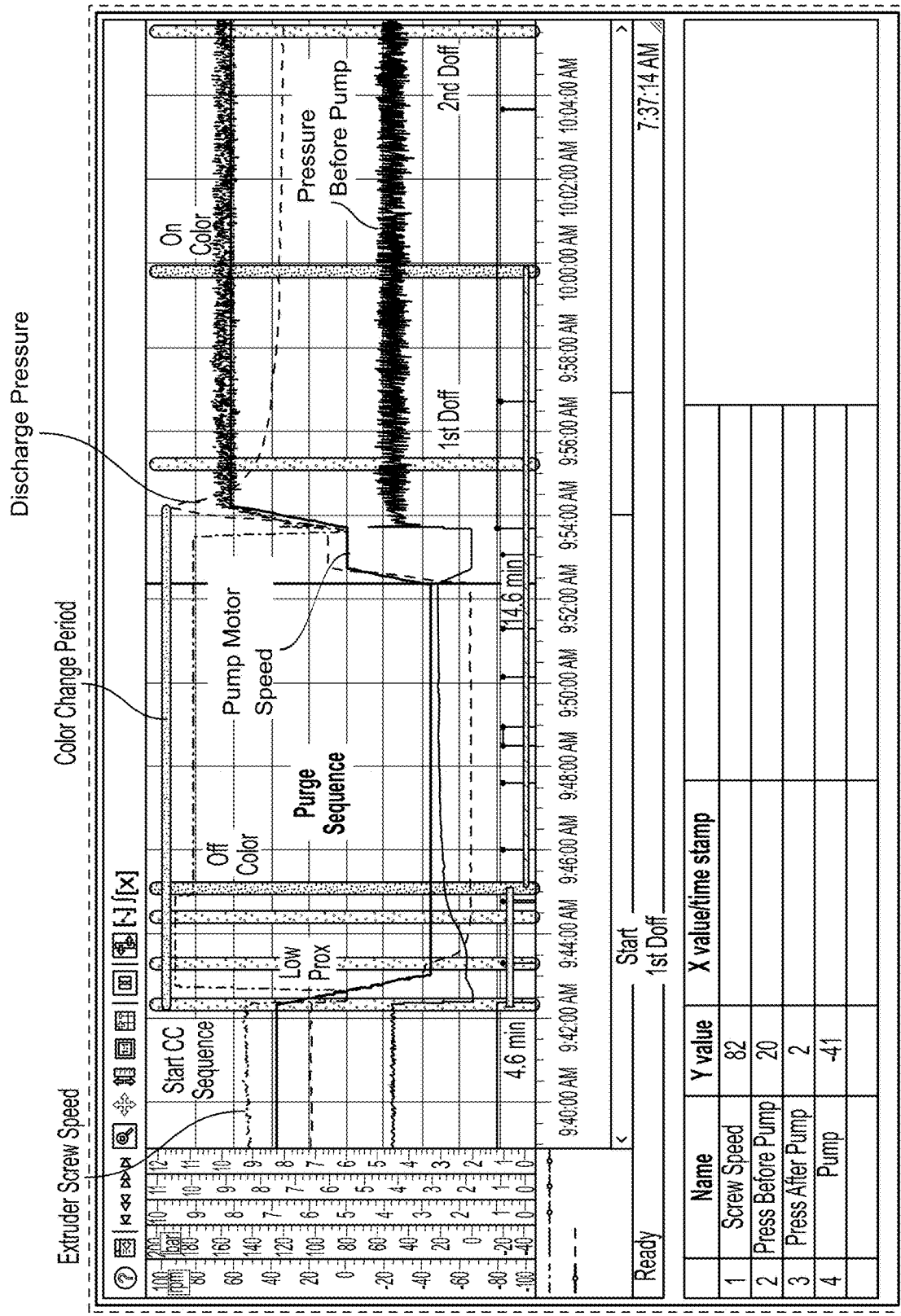
FIG. 13A illustrates a time series plot of instrumentation of a second exemplary trial for the same color change as the first exemplary yarn color change run.

FIG. 13A illustrates a second exemplary trial for the same color change as the first exemplary yarn color change run, but, instead of "Disco" Purging, the RPM of the Melt Pump running in reverse was held steady. Thus, the second exemplary change run followed the following process:
1. Feed of the Old Color concentrate was stopped around 9:40 AM. Then the Extruder and Melt Pump were stopped to allow the second diverter valve 112 to go into Purge Position. Then the Extruder and Melt Pump were re-started, with the Melt Pump RPM reversed to begin pulling Virgin PET from the Main Extruder through the mixing union, the first diverter valve 130', and Melt Pump.
2. Again, Time Zero was when the Old Color in the SA Extruder ran below the first proximity switch 160 at 9:43 AM (see "Low Prox" in FIG. 13A).
3. The Melt Pump purged at a constant reverse RPM of 45 for ten minutes.
4. The Melt Pump went down at 9:53 and waited for the Extruder to finish its purging sequences, which were:
A. First, five minutes purging with Virgin PET pellets.
B. Second, five minutes purging with the New Color.
5. At 9:54, the second diverter valve 112 was returned to its Production Position, and the Extruder and Melt Pump began supplying the New Color concentrate to the spin beam.

Figure 13B:
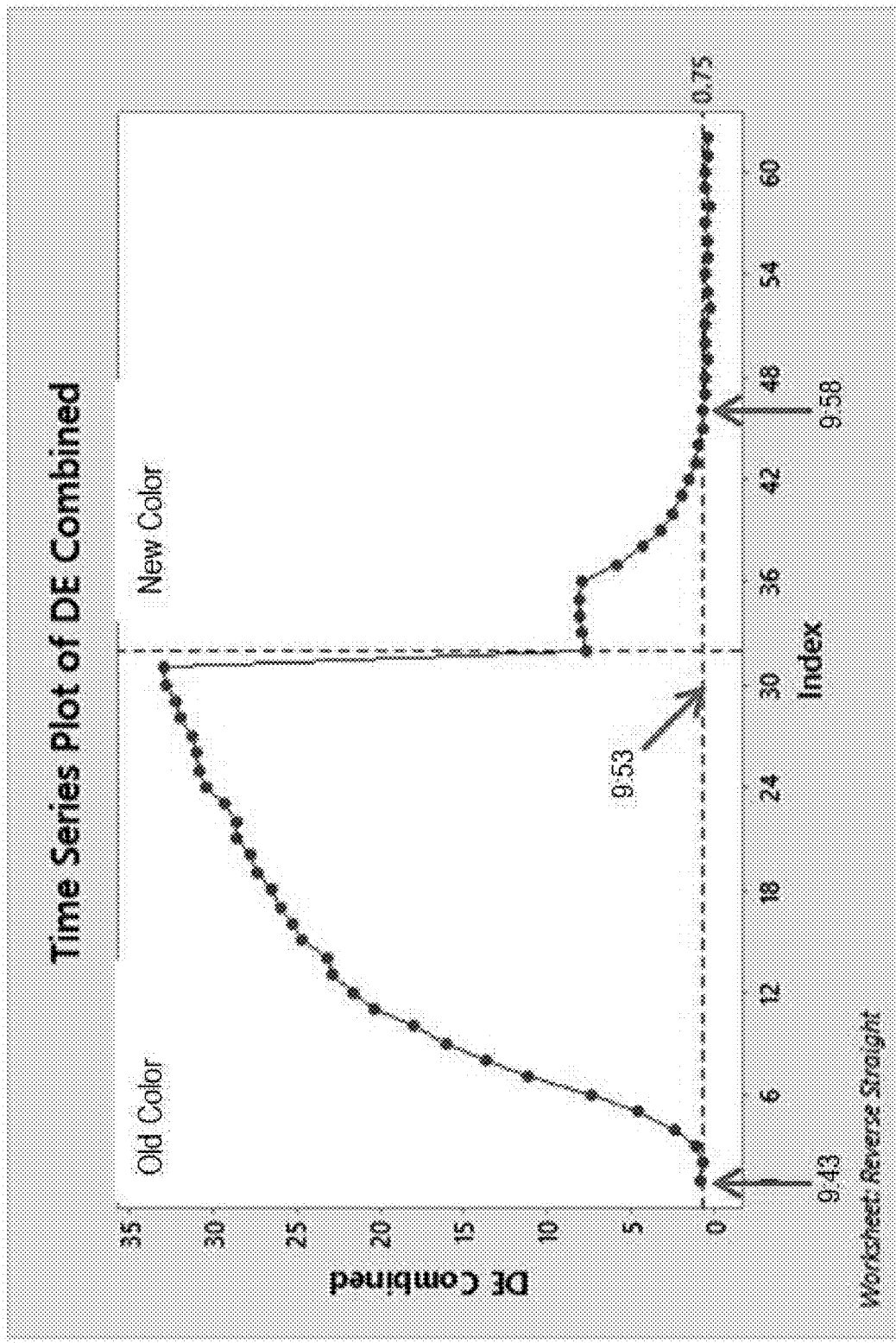
FIG. 13B illustrates a time series plot of the color of the yarn produced on the winder over time for the second exemplary yarn color change run.

FIG. 13B illustrates the color of the yarn produced on the winder over time for the second exemplary yarn color change run. Time Zero from the process trace is noted on the graph at 9:43 AM. After ten minutes of purging on the SA Extruder, the winder was doffed. Color was on-spec according to the New Color Standard by 9:58 AM, which was a color changeover time of 15 minutes.

Figure 14A:
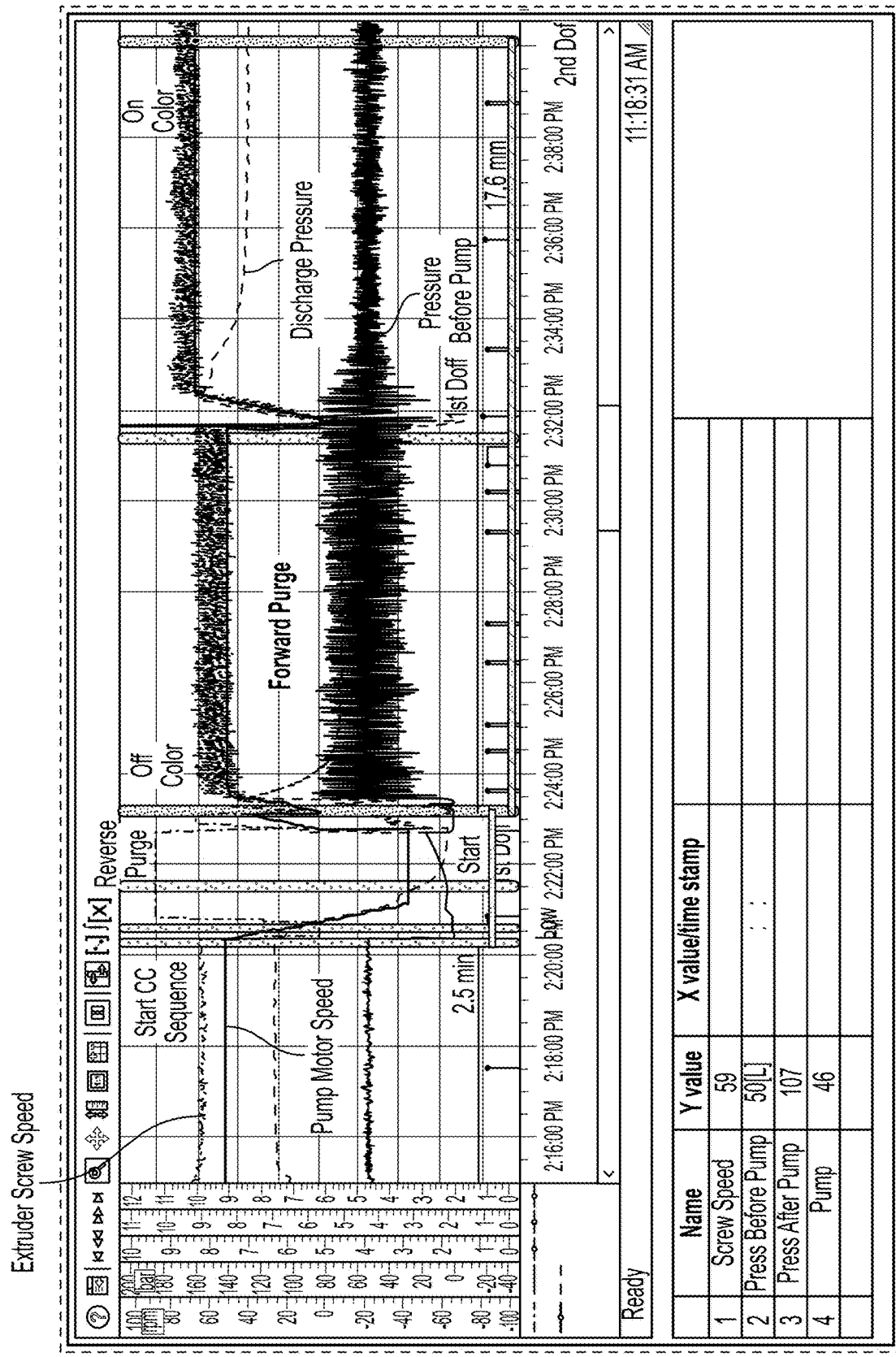
FIG. 14A illustrates a time series plot of instrumentation of a third exemplary yarn color change run.

FIG. 14A illustrates a third exemplary yarn color change run wherein purging was tested with the melt pump running first in the reverse direction, and then in the forward direction, for the remainder of the purge. The third exemplary change run followed the following process:
1. Prior to 2:20 PM, the Old Color concentrate feed to the SA Extruder blender was stopped. At 2:20 PM, the Extruder and Melt Pump were stopped, the second diverter valve 112 was moved to the Purge Position, and the melt pump rotation was reversed to pump backwards. Then the Extruder and Melt Pump were re-started. The first diverter valve 130' was left in Production Position.
2. At 2:21 PM, the Old Color concentrate fell below the first proximity switch 160, and Time Zero was noted.
3. Virgin PET resin was charged to the Extruder, and the extruder ran at 80 RPM for two minutes to purge out the Old Color concentrate through the second diverter valve 112.
4. For the same two-minute period, the Melt Pump, running at a constant 40 RPM, pulled natural PET melt from the Main Extruder through the mixing union, through the second diverter valve 130', and through the Melt Pump, dumping through the second purge path, 115B.
5. At 2:23 PM, the SA Extruder and Melt Pump were shut down, the second diverter valve 112 was returned to the Production Position, and the first diverter valve 130' was moved to the Purge Position. The Melt Pump rotation was reversed to pump in the usual forward direction, and the Extruder and Melt Pump were restarted.
6. Virgin PET continued to be fed to the Extruder for 8 minutes, purging through the Melt Pump through to the first diverter valve 130'.
7. The Extruder and Melt Pump were shut down at 2:31, and the first diverter valve 130' was returned to Production Position.
8. New Color concentrate was charged to the Extruder, and the Extruder and Melt Pump were re-started at 2:32, supplying New Color concentrate to the Spin Beam.

Figure 14B:
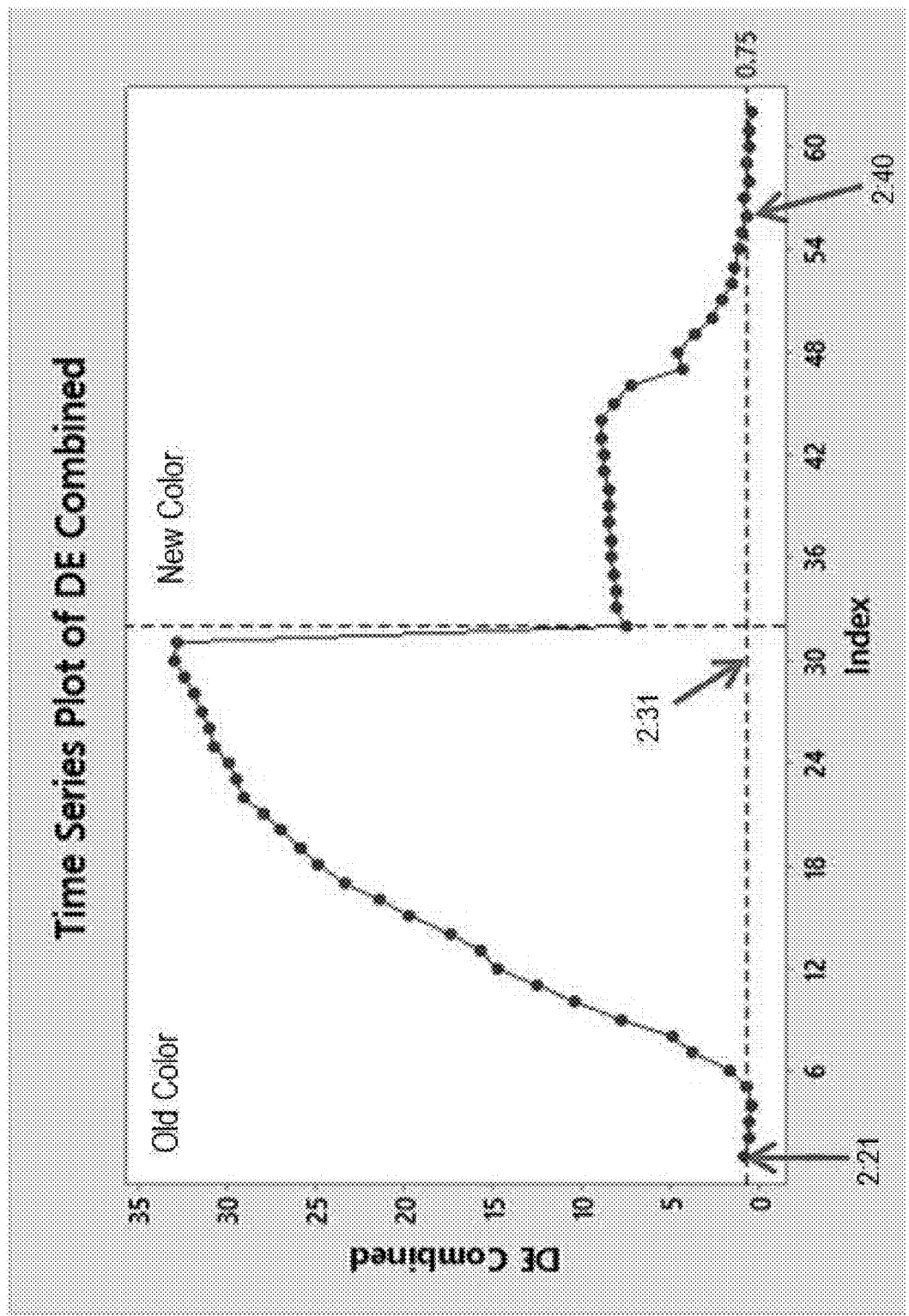
FIG. 14B illustrates a time series plot of the color of the yarn produced on the winder over time for the third exemplary yarn color change run.

FIG. 14B illustrates the color of the yarn produced on the winder over time for the third exemplary yarn color change run. The winder was doffed at 2:31, which corresponded with the end of the SA Extruder and Melt Pump purge sequence. The new cone was measured against the New Color Standard, and DE fell to 0.75 within 8 minutes of the New Color concentrate being charged to the SA Extruder. The total Color Change Time was 19 min.

Figure 15A:
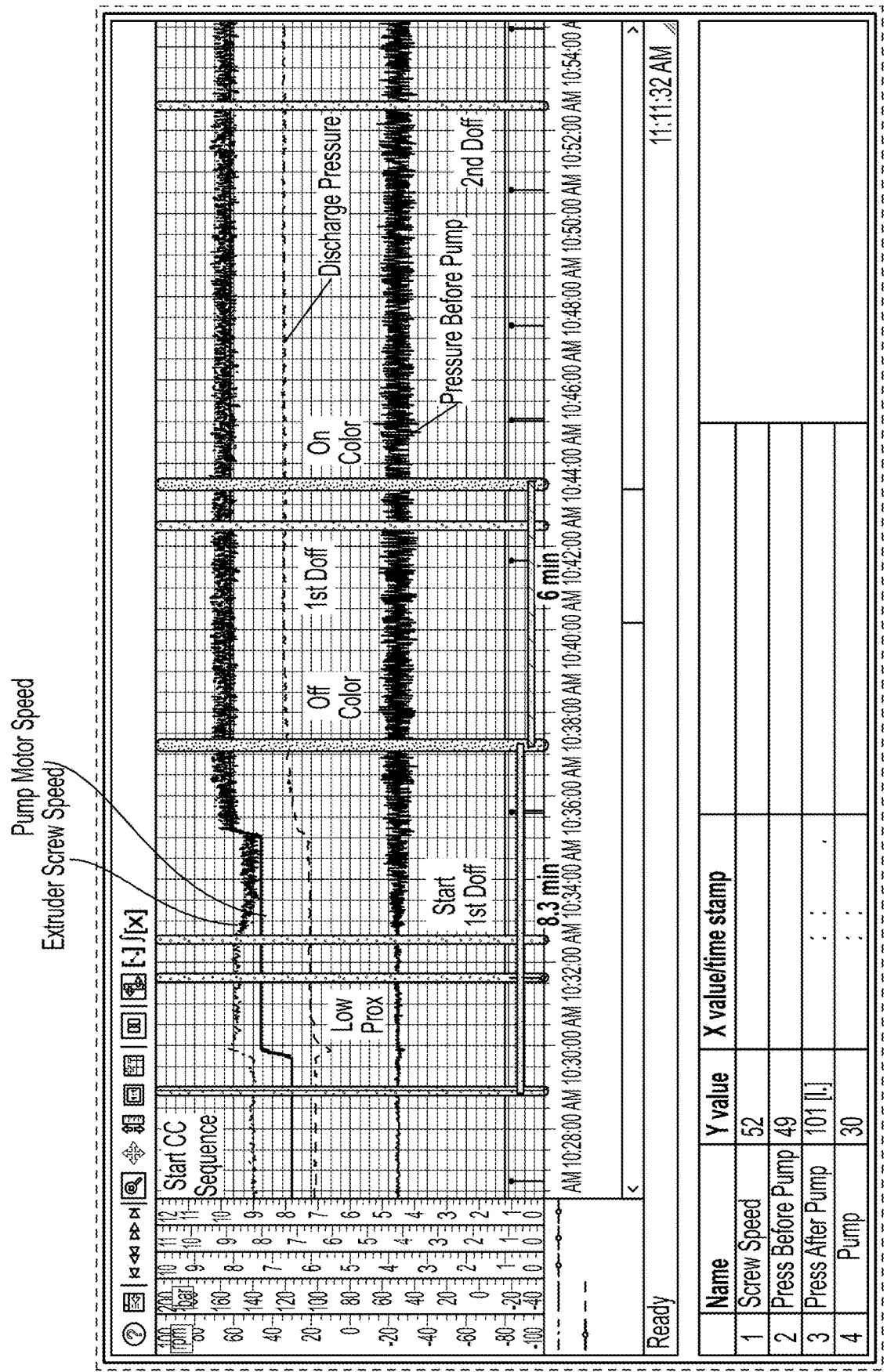
FIG. 15A illustrates a time series plot of instrumentation of a fourth exemplary yarn color change run wherein the first and second valves were maintained in their production configurations.

FIG. 15A illustrates a fourth exemplary yarn color change run wherein the first and second diverter valves were maintained in their production configurations (FIGS. 27A and 7A, respectively) so that the Old Color concentrate was purged out of the outlet of the side arm extruder assembly and into the transfer lines. The fourth exemplary color change run followed the following process:
1. The Old Color concentrate feed was stopped to the SA Extruder sometime around 10:28 AM. The level fell below the first proximity switch 160 at 10:32, which was Time Zero for this trial. At this point, the New Color concentrate was added to the extruder downcomer.
2. The positions of the first and second diverter valves were not changed, so output to the spin beam was not disturbed during the transition from the Old Color to the New Color.
3. Three minutes after Time Zero, the Melt Pump RPM was adjusted up to 60, which was equal to the required let down for the New Color.

Figure 15B:
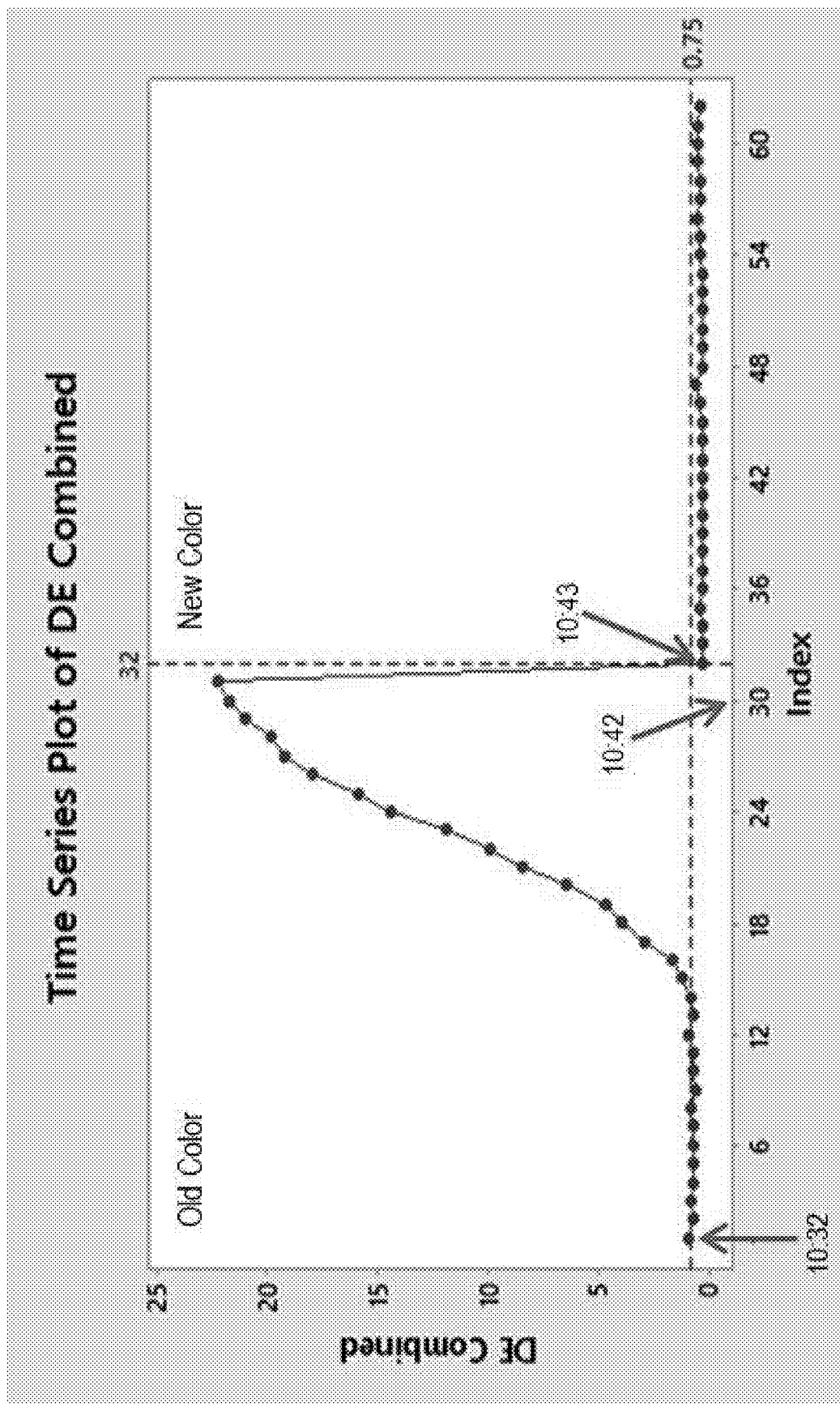
FIG. 15B illustrates a time series plot of the color of the yarn produced on the winder over time for the fourth exemplary yarn color change run.

FIG. 15B illustrates the color of the yarn produced on the winder over time for the fourth exemplary yarn color change run. When the cone was doffed ten minutes after the color change procedure was started, the color was found to be immediately on-spec. Total color change time was 11 minutes.

Figure 16A:
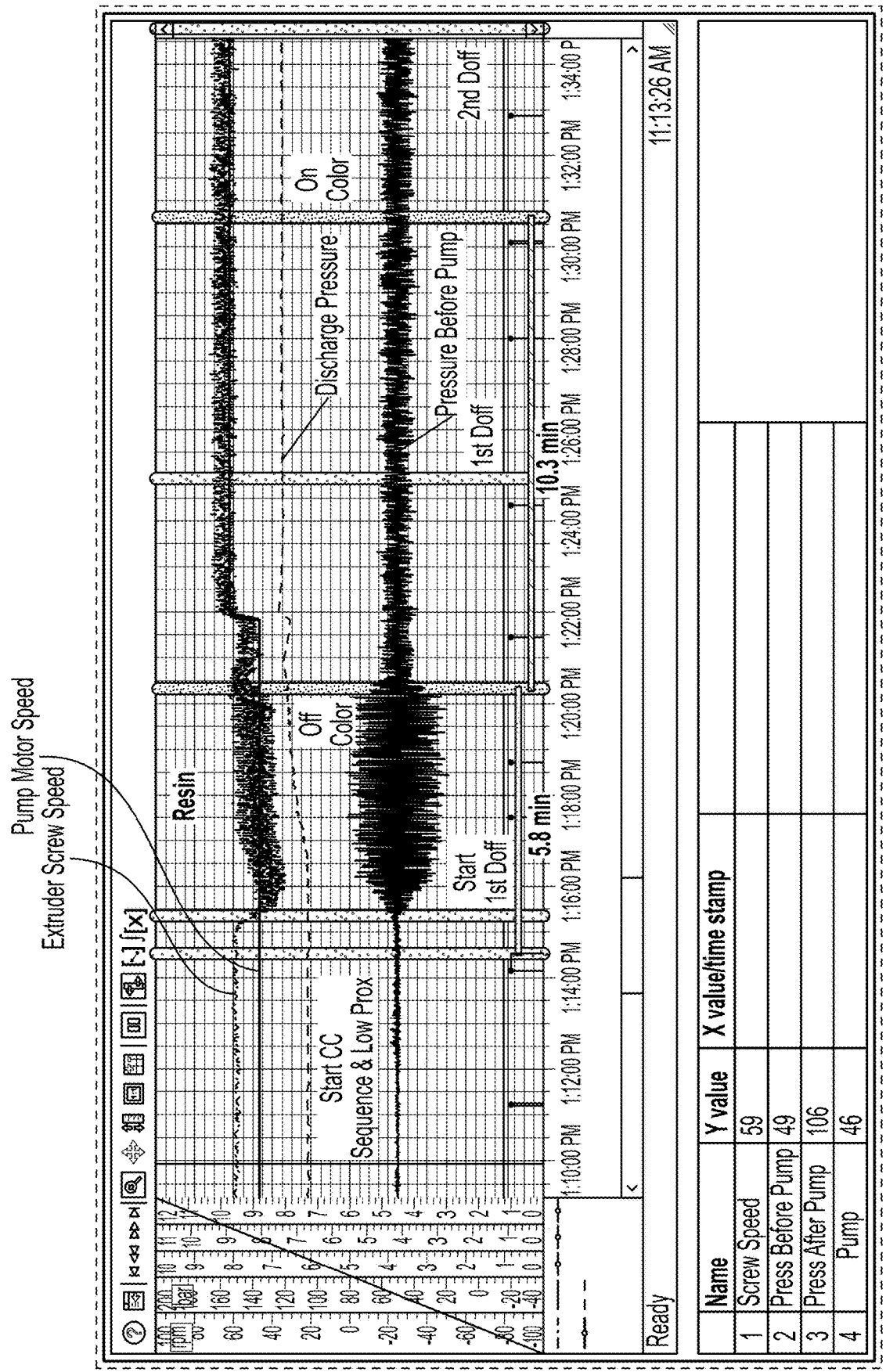
FIG. 16A illustrates a time series plot of instrumentation of the color change between a fifth exemplary color change run with an intermediate flushing of virgin PET resin added between colors to flush the system.

FIG. 16A illustrates the color change between a fifth exemplary color change run with an intermediate flushing of virgin PET resin added between colors to flush the system. Like the fourth exemplary yarn color change run, the first and second diverter valves were maintained in their production configurations (FIGS. 27A and 7A, respectively) so that the Old Color concentrate was purged out of the outlet of the side arm extruder assembly and into the transfer lines. The fourth exemplary change run followed the following process:
1. The Old Color concentrate fell below the first proximity switch 160 at 1:14 PM (Time Zero).
2. 3 Lb of virgin PET resin was charged to the Extruder and ran for six minutes.
3. The New Color concentrate was charged at 1:21 PM. The Melt Pump RPM was adjusted to the new letdown at 1:22 PM.

Figure 16B:
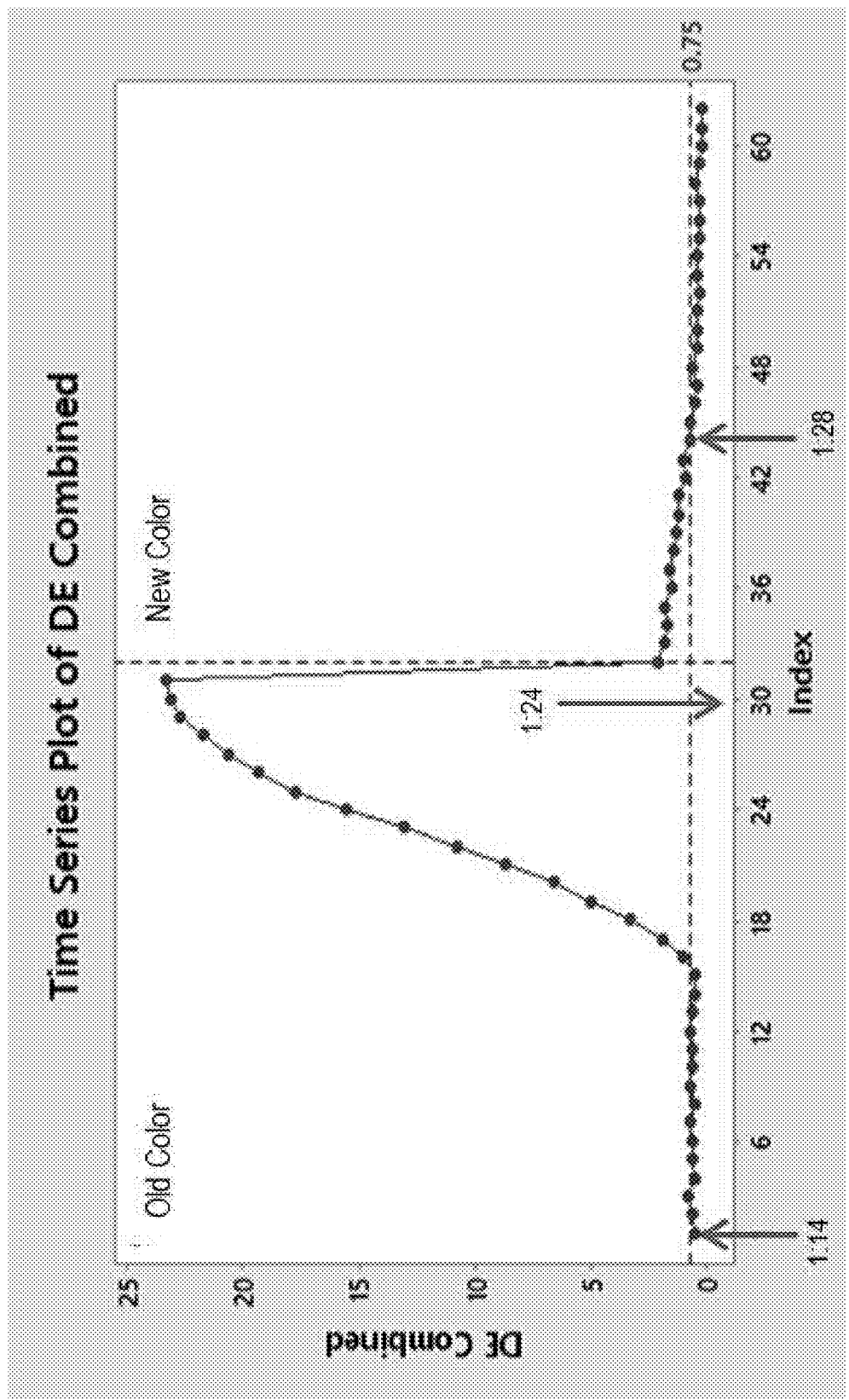
FIG. 16B illustrates a time series plot of the color of the yarn produced on the winder over time for the fifth exemplary yarn color change run.

FIG. 16B illustrates the color of the yarn produced on the winder over time for the fifth exemplary yarn color change run. The winder was doffed at 1:24 PM, and the color was on-spec by 1:28, for a 14 minute color change time.

Figure 17:
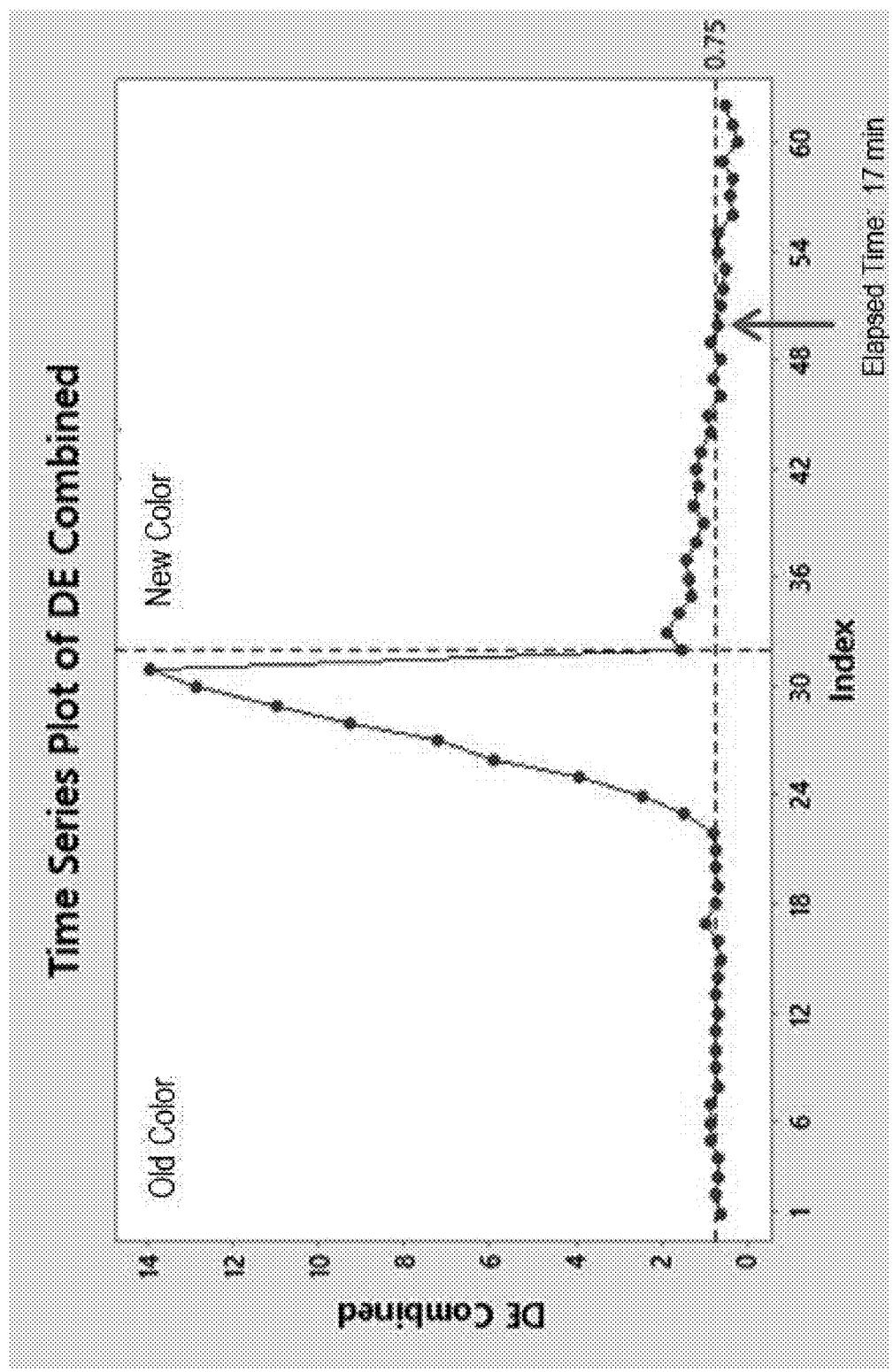
FIG. 17 illustrates a time series plot of the color of the yarn produced on the winder over time for a reference sixth exemplary run for a pilot line without using the side arm assembly and instead feeding the colored polymer directly to the main extruder using a conventional blender.

FIG. 17 illustrates the color of the yarn produced on the winder over time for a reference sixth exemplary run for a pilot line without using the side arm assembly and instead feeding the color directly to the main extruder 12 (FIG. 1). As can be understood, because this exemplary run was performed on a pilot line, it is not indicative of time and waste caused for a large scale system, and it can be understood that a full-scale system would take more time and cause more waste. The x-axis in FIG. 17 is the number of "time increments" during the color change, where each time increment, or index, is twenty seconds. Total time was 50 increments, 1000 seconds, or about 17 minutes.

In summary, to complete the respective color changes, example 1 took 16 minutes, example 2 took 15 minutes, example 3 took 19 minutes, example 4 took 11 minutes, example 5 took 14 minutes, and example 6 took 17 minutes.

Exemplary yarn color change runs seven through twelve were performed on a pilot line comprising a side arm extruder assembly 100 in accordance with the preferred side arm configuration shown in FIG. 2. Each of yarn changes 7-9 were "easy" changes, transitioning from a dark brown to a light tan. Examples 10-12 tested color changes from a red to a light tan, which can be a more difficult and time consuming transition than transitioning from a dark brown to a light tan, as in exemplary color changes 1-9. Each test used the following protocol:
1. The Old Color was allowed to run low in the Extruder Hopper (downcomer), running below the first proximity switch 160. (Time Zero)
2. The Extruder and Melt Pump were shut down.
3. The first diverter valve 130 (at the end), was switched to the Purge Position (FIG. 3B).
4. The Extruder and Melt Pump were turned back on, and then one of three resins was charged to the Extruder:
    A. Virgin PET;
    B. TiO$_2$ Concentrate; or
    C. New Color concentrate.
5. The extruder continued to run for a designated PURGE time, then no further material was dropped into the Extruder to allow the Purge Resin to run down below the first proximity switch 160.
5. Once the level dropped, the New Color concentrate was added (already running if used for the First Purge time), and a second Purge Time was run.
6. At the end of the Second Purge Time, the Extruder and Melt Pump were turned off, and the first diverter valve 130 was moved back to the Production Position (FIG. 3A).
7. The Extruder and Melt Pump were turned back on, the Melt Pump was adjusted to the required New Color let down rate (already predetermined), and the yarn packages at the winder were monitored for DE on spec (<0.75).

Figure 18:
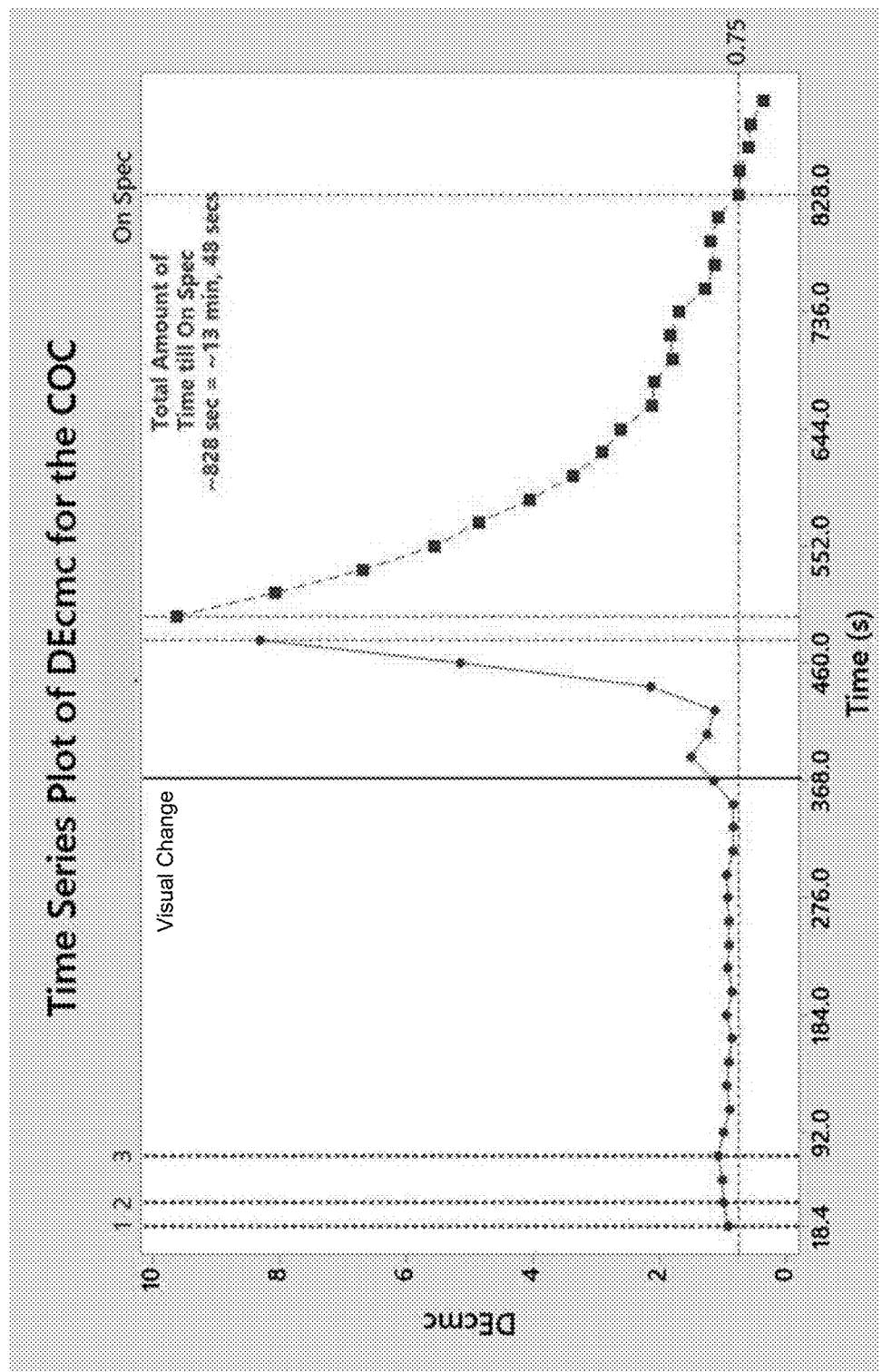
FIG. 18 illustrates a time series plot of the color of the yarn produced on the winder over time for the seventh exemplary yarn color change run.

FIG. 18 illustrates the color of the yarn produced on the winder over time for the seventh exemplary yarn color change run. In this exemplary run, the Old Color concentrate ran down below the first proximity switch 160, and the New Color concentrate was charged to the Extruder (a "Color-on-Color" procedure). The first diverter valve 130 remained in Production Position (FIG. 3A). As can be seen, the New Color was on-spec after 14 minutes. The vertical bar at 368 seconds indicates when the color first started to change on the winder—about six minutes after the color change procedure started.

Figure 19:
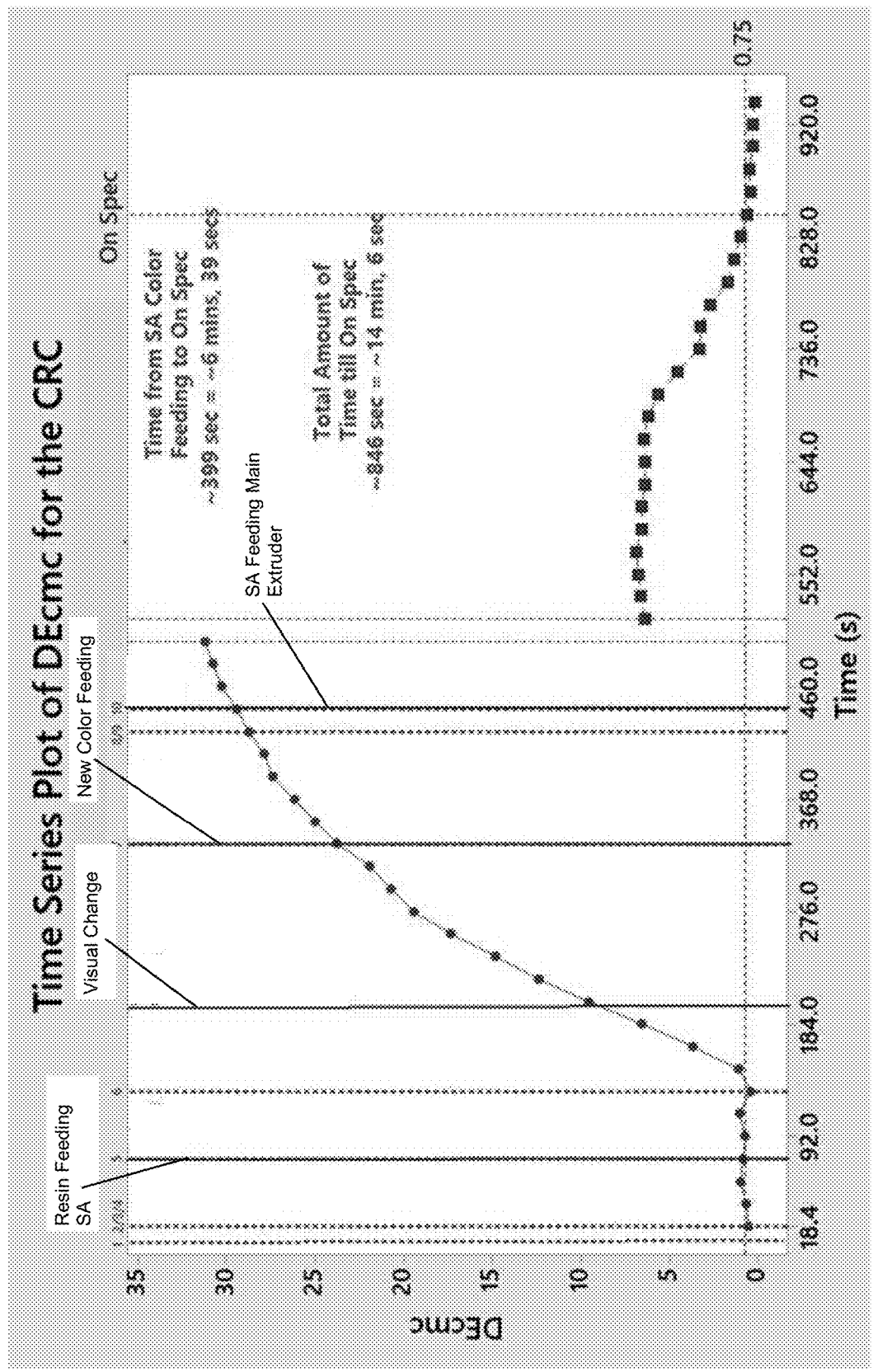
FIG. 19 illustrates a time series plot of the color of the yarn produced on the winder over time for the eighth exemplary yarn color change run.

FIG. 19 illustrates the color of the yarn produced on the winder over time for the eighth exemplary yarn color change run. In this example, virgin PET was changed to the side arm extruder after the old color dropped to the first proximity switch 160 (between 98 and 108 seconds) (a "Color-Resin-Color" procedure). The first purge time, step 4, was 30 seconds (Melt Pump at 45 RPM), at which time, no further Virgin PET was charged to the Extruder hopper (Step 5 in FIG. 19). The resin was allowed to fall below the first proximity switch 160, and then the New Color concentrate was charged and ran for another 30 second sec purge time (Melt Pump at 45 RPM) (Step 7 in FIG. 19). Then, the Extruder and Melt Pump were shut down, The first diverter valve 130 was returned to the Production Position (FIG. 3A), and the Extruder and Melt Pump were re-started, with the Melt Pump set to the required New Color let down. The New Color yarn DE came on-spec after 14 min of total color changeover time.

Figure 20:
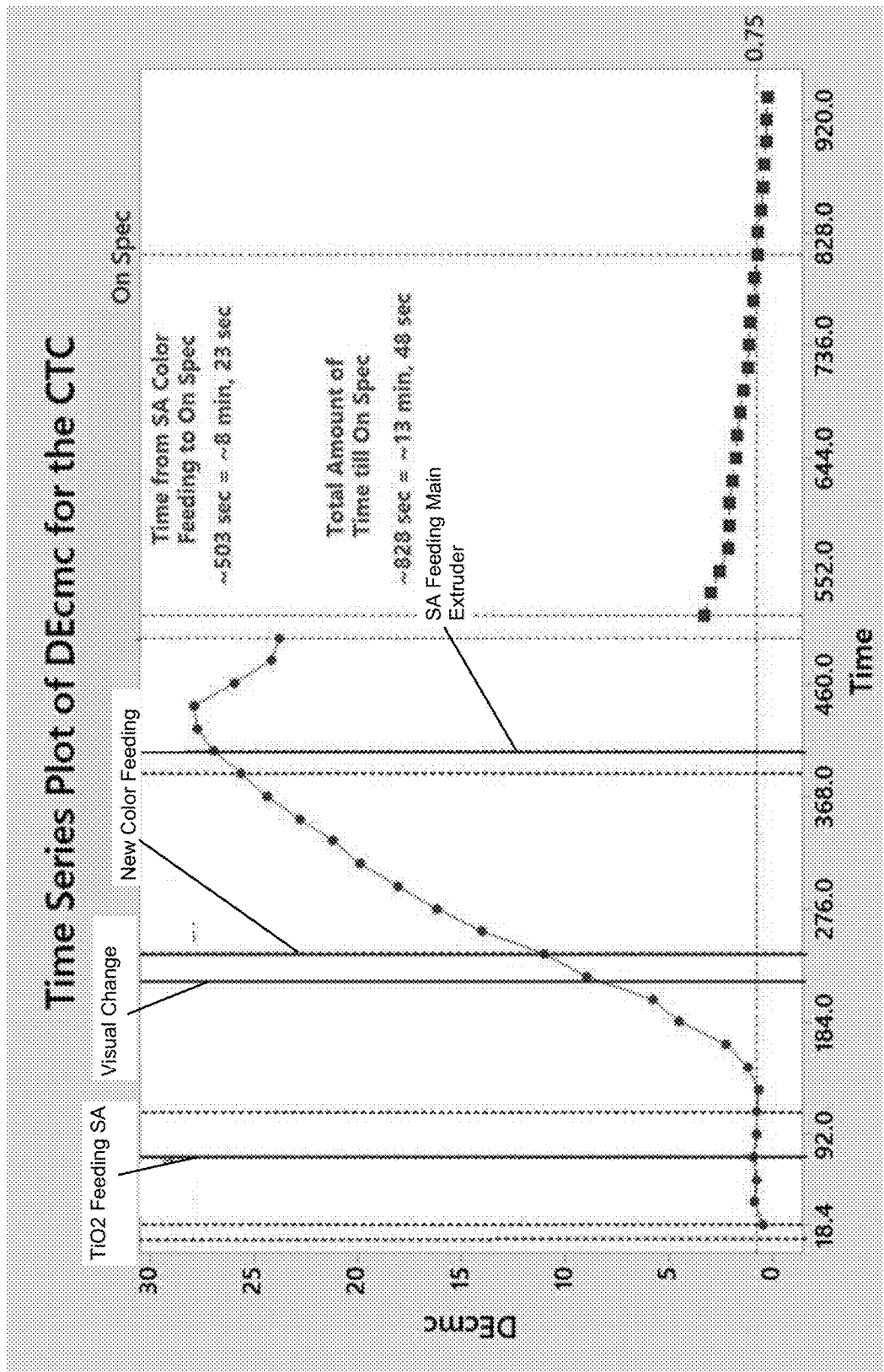
FIG. 20 illustrates a time series plot of the color of the yarn produced on the winder over time for the ninth exemplary yarn color change run.

FIG. 20 illustrates the color of the yarn produced on the winder over time for the ninth exemplary yarn color change run. The first purge time was 30 seconds (Melt Pump at 45 RPM), at which time, no further $TiO_2$ was charged to the Extruder hopper (Step 5 in FIG. 20) (a "Color-TiO2-Color" procedure). The $TiO_2$ was allowed to fall below the first proximity switch 160, and then the New Color concentrate was charged and ran for another 30 second purge time (Melt Pump at 45 RPM) (Step 7 in FIG. 20). Next, the Extruder and Melt Pump were shut down, the first diverter valve 130 was returned to the Production Position (FIG. 3A), and the Extruder and Melt Pump were re-started, with the Melt Pump set to the required New Color let down. The DE came on-spec after 13.8 min of total color changeover time.

Figure 21:
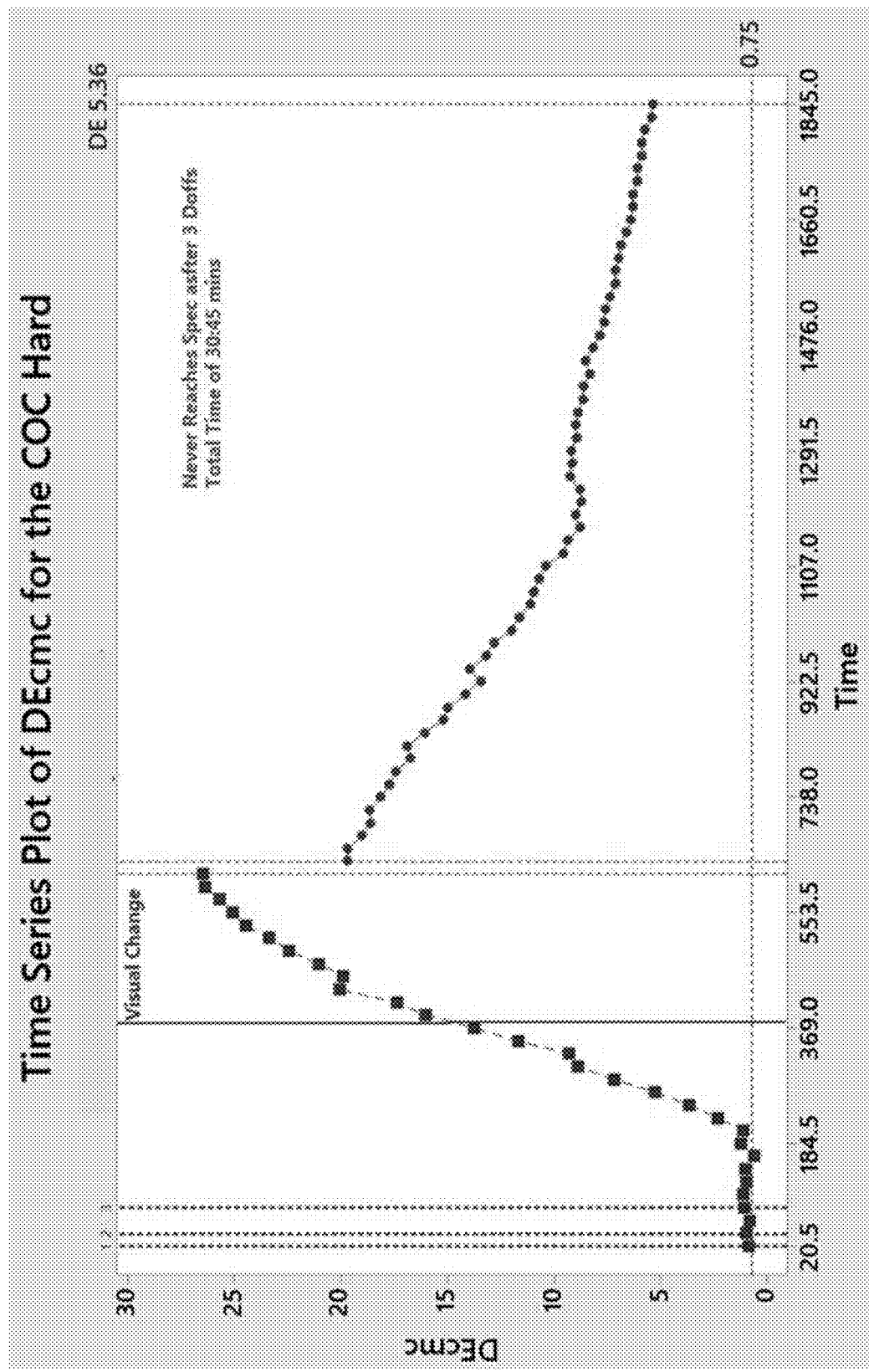
FIG. 21 illustrates a time series plot of the color of the yarn produced on the winder over time for the tenth exemplary yarn color change run.

FIG. 21 illustrates the color of the yarn produced on the winder over time for the tenth exemplary yarn color change run, which is the first example of a "hard" color change from red to light tan. In this exemplary yarn run, the New concentrate Color was used, and there were no purges. The Old Color concentrate ran down below the first proximity switch 160, and the New Color concentrate was charged to the Extruder. The first diverter valve 130 remained in Production Position (FIG. 3A). As shown, this procedure was not successful in bringing the color on-spec even after three doffs (30 minutes). The trial was stopped at a yarn DE of 5.36.

Figure 22:
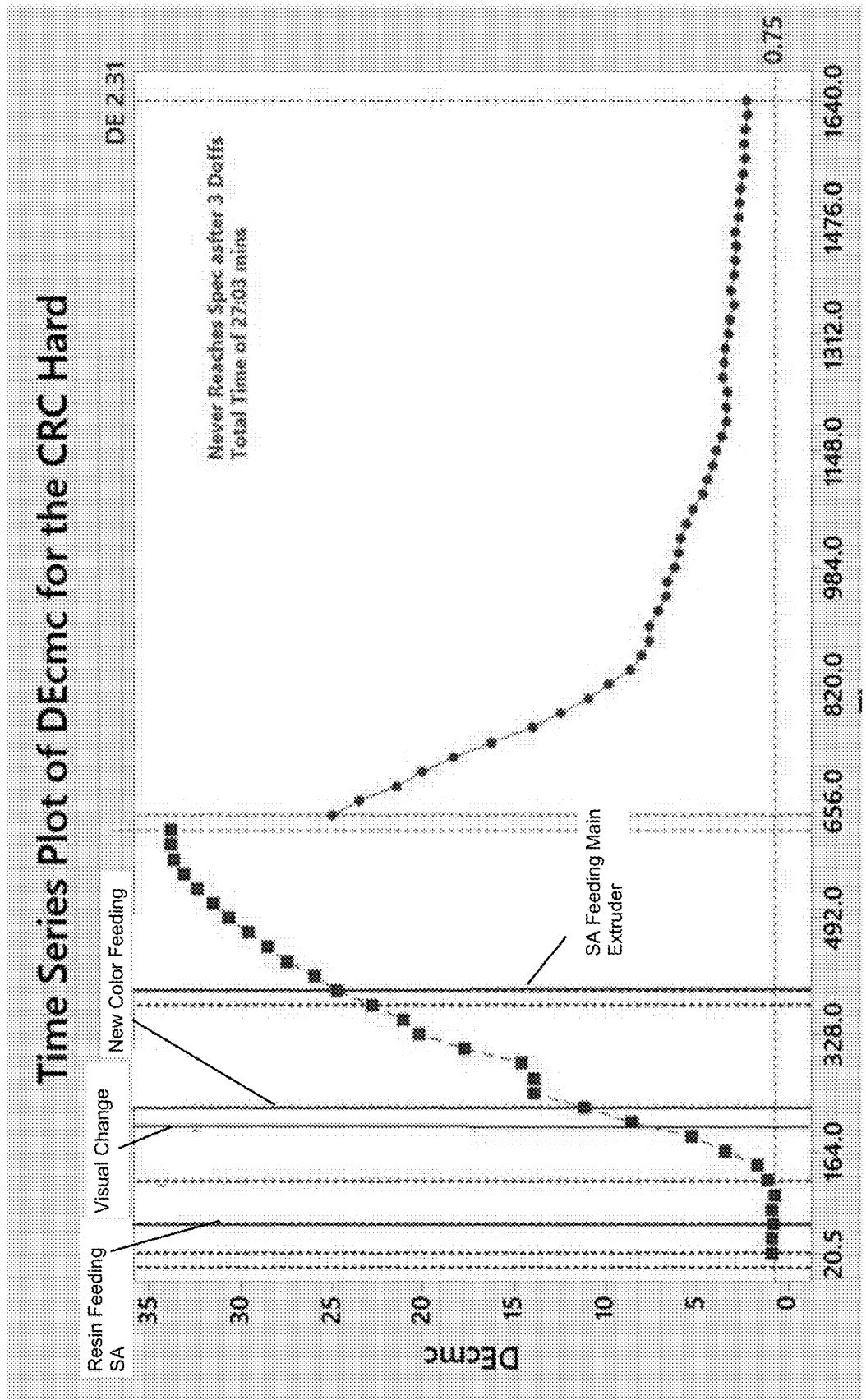
FIG. 22 illustrates a time series plot of the color of the yarn produced on the winder over time for the eleventh exemplary yarn color change run.

FIG. 22 illustrates the color of the yarn produced on the winder over time for the eleventh exemplary yarn color change run, which was a repeat of the "hard" color change from red to light tan. In this exemplary yarn run, the first Purge Resin was Virgin PET. The first purge time was 30 seconds (Melt Pump at 45 RPM), at which time, no further Virgin PET was charged to the Extruder hopper (Step 5 in FIG. 22). The resin was allowed to fall below the first proximity switch 160, and then the New Color concentrate was charged and ran for a second 30 second sec purge (Melt Pump at 45 RPM) (Step 7 in FIG. 22). Then, the Extruder and Melt Pump were shut down, The first diverter valve 130 was returned to the Production Position (FIG. 3A), and the Extruder and Melt Pump were re-started, with the Melt Pump set to the required New Color let down. This procedure was more successful, as the final DE after three doffs (27 minutes) was much closer to the 0.75 on-spec value. This proved the value of purging out the Old Color concentrate prior to starting the New Color concentrate. Still, the yarn was not on-spec after 27 minutes, with a final DE of 2.31.

Figure 23:
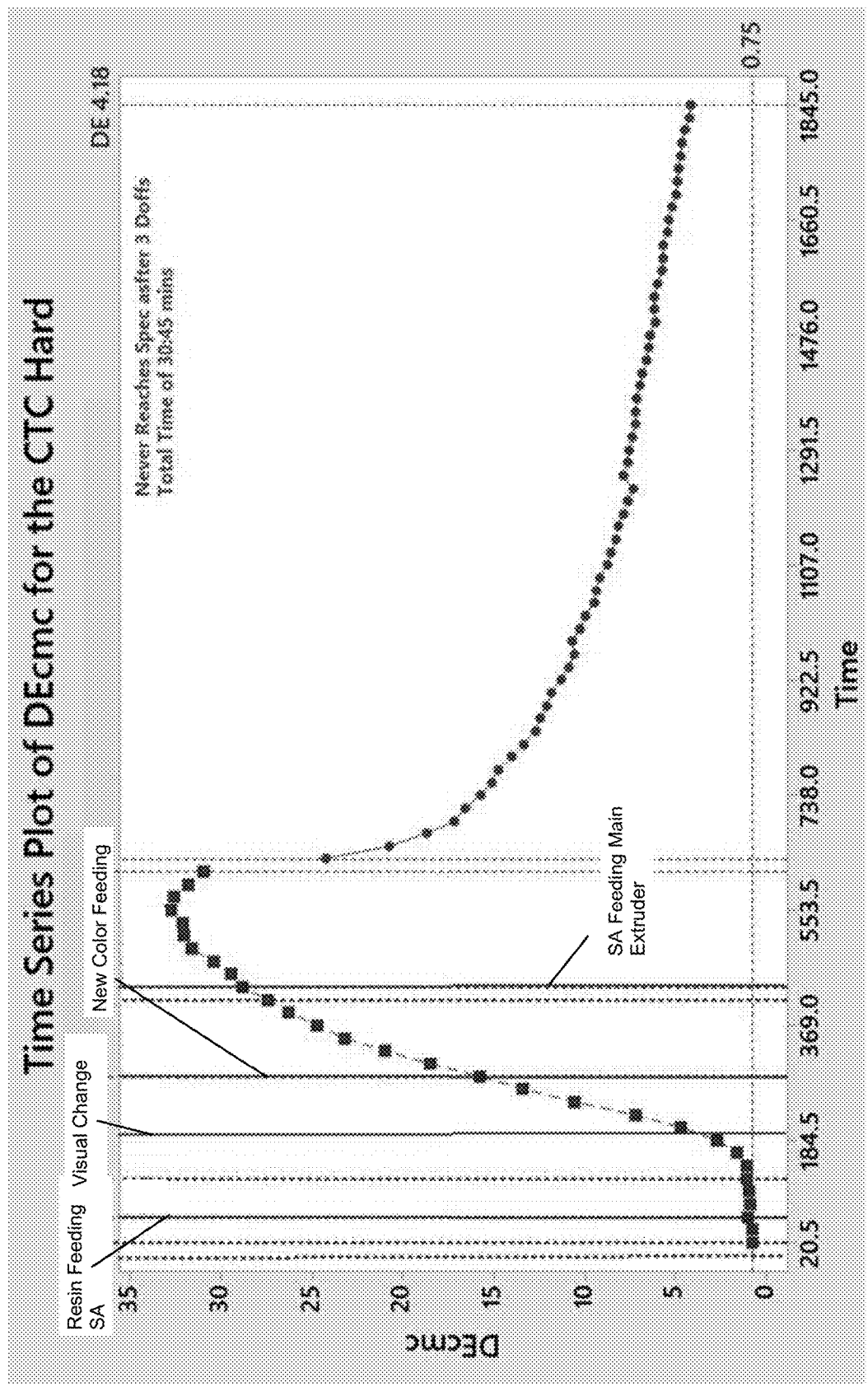
FIG. 23 illustrates a time series plot of the color of the yarn produced on the winder over time for the twelfth exemplary yarn color change run.

FIG. 23 illustrates the color of the yarn produced on the winder over time for the twelfth exemplary yarn color change run (a third repeat of a "hard" red to light tan color change). In this exemplary yarn run, the first Purge Resin was TiO2 concentrate. The first purge time was 30 seconds (Melt Pump at 45 RPM), at which time, no further $TiO_2$ was charged to the Extruder hopper. The resin was allowed to fall below the first proximity switch 160, and then the New Color concentrate was charged and ran for another 30 second purge time (Melt Pump at 45 RPM) (Step 7 in FIG. 23). Then, the Extruder and Melt Pump were shut down, the first diverter valve 130 was returned to the Production Position, and the Extruder and Melt Pump were re-started, with the Melt Pump set to the required New Color let down. Using a $TiO_2$ concentrate was not as effective as using the Virgin PET, as the DE was 4.18 after 30 min—only slightly better than the 5.36 DE seen in the first, Color-on-Color example (see FIG. 21). It is felt that the higher viscosity of the Virgin PET vs. the $TiO_2$ concentrate may have accounted for the more effective purging of the Old (red) Color.

In summary, to complete the respective "easy" color changes, examples 7-9, each took 14 minutes. For the respective "hard" color change examples 10-12, all were stopped after approximately 30 minutes, and none achieved the required 0.75 DE color specification.

Computing Device

Figure 24:
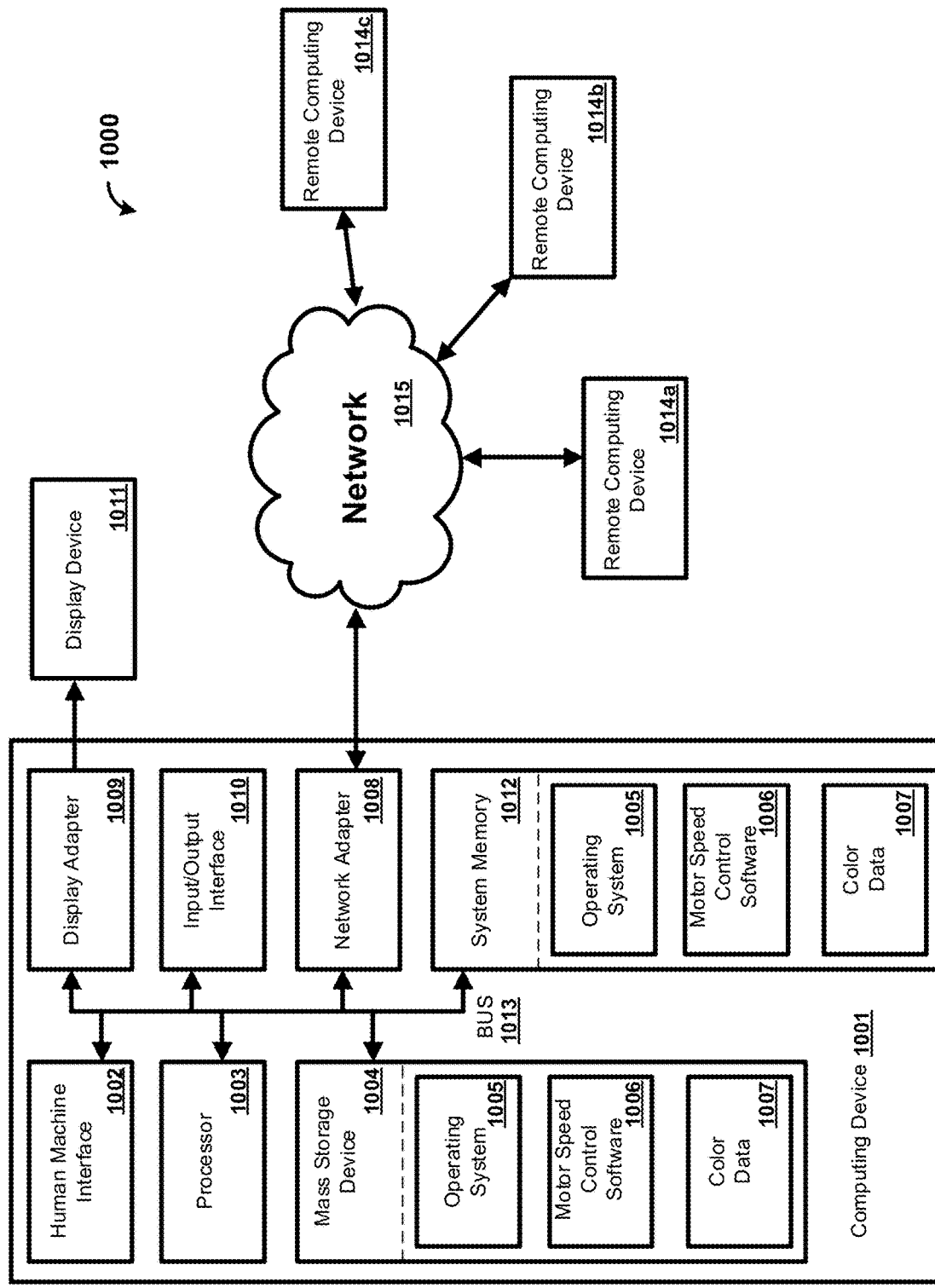
FIG. 24 illustrates a computing device and computing system for use with the system of FIG. 1.

FIG. 24 shows a computing system 1000 including an exemplary configuration of a computing device 1001 for use with the (colored yarn production) system 10. In some aspects, the computing device 1001 can be part of a plant network. In further aspects, it is contemplated that a separate computing device, such as, for example, a tablet, laptop, or desktop computer can communicate with the system 10 and can enable the operator to interface with the system 10.

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as color data 1007 and/or program modules such as operating system 1005 and motor speed control software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and motor speed control software 1006 may be stored on the mass storage device 1004. One or more of the operating system 1005 and motor speed control software 1006 (or some combination thereof) may comprise program modules and the motor speed control software 1006. Color data 1007 may also be stored on the mass storage device 1004. Color data 1007 may be stored in any of one or more databases known in the art. The databases may be centralized or distributed across multiple locations within the network 1015.

A user may enter commands and information into the computing device 1001 using an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display device 1011 and computing device 1001 may be part of one device, or separate devices.

The computing device 1001 may operate in a networked environment using logical connections to one or more remote computing devices 1014a,b,c. A remote computing device 1014a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computing device 1001 and a remote computing device 1014a,b,c may be made using a network 1015, such as a local area network (LAN) and/or a general wide area network (WAN). Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014a,b,c can optionally have some or all of the components disclosed as being part of computing device 1001.

EXEMPLARY ASPECTS

In view of the described device, systems, and methods and variations thereof, herein below are certain more particularly described aspects of the invention. These particularly recited aspects should not, however, be interpreted to have any limiting effect on any different claims containing different or more general teachings described herein, or that the "particular" aspects are somehow limited in some way other than the inherent meanings of the language literally used therein.

Aspect 1: A system for making polymeric product comprising: a primary polymer melt source configured to receive a polymer feedstock composition, wherein the primary polymer melt source has an outlet in fluid communication with a transfer line configured to receive a polymer melt from the primary polymer melt source and transfer the polymer melt in a flow direction that is towards a product forming device; and a side arm extruder assembly positioned along the transfer line between the primary polymer melt source and the product forming device, wherein the side arm extruder assembly comprises an outlet positioned within the transfer line to inject a colored polymer melt concentrate into the transfer line.

Aspect 2: The system of aspect 1, wherein the primary polymer melt source is a main extruder.

Aspect 3: The system of aspect 1, wherein the primary polymer melt source is one of a melting pin, or a polymerization reactor.

Aspect 4: The system of any one of aspects 1-3, wherein the product forming device is a spinneret.

Aspect 5: The system of any one of aspects 1-3, wherein the product forming device is one of an injection mold, a blow mold, a film die, a pipe die, a profile die, a thermoforming die, a pelletizer, or an extruder.

Aspect 6: The system of any one of the preceding aspects, wherein the side arm extruder assembly comprises an extruder, a first valve, and a melt pump; wherein an outlet of the extruder is in fluid communication with an inlet of the melt pump; wherein an outlet of the melt pump is in fluid communication with an inlet of a product channel in the first valve; wherein the first valve further comprises a purge channel; wherein the first valve further comprises a diverter that can selectively be positioned to direct a flow of colored polymer melt concentrate from the melt pump to the purge channel via a portion of the product channel; and wherein an outlet of the product channel in the first valve is in fluid communication with the outlet of the side arm extruder assembly.

Aspect 7: The system of aspect 6, wherein the side arm extruder further comprises a second valve; wherein an outlet of the extruder is in fluid communication with an inlet of a product channel in the second valve; wherein an outlet of the product channel in the second valve is in fluid communication with the inlet of the melt pump; and wherein the second valve further comprises a diverter, a first purge channel, and a second purge channel, wherein the diverter can selectively be positioned to: direct the flow of colored polymer melt concentrate from the extruder to the first purge channel via a first portion of the product channel, and direct the flow of colored polymer melt concentrate from the melt pump to the second purge channel via a second portion of the product channel.

Aspect 8: The system of aspect 6 or aspect 7, further comprising a first filter positioned between extruder and the melt pump.

Aspect 9: The system of any one of the preceding aspects, further comprising a second filter positioned between the melt pump and the first valve.

Aspect 10: The system of any one of the preceding aspects, wherein the transfer line comprises a mixer positioned between the outlet of the side arm extruder assembly and the product forming device.

Aspect 11: The system of any one of the preceding aspects, wherein the side arm extruder is configured to inject the colored polymer melt concentrate into the transfer line in a direction counter to the flow direction of the polymer melt from the primary polymer melt source to the product forming device.

Aspect 12: The system any one of aspects 1-10, wherein the side arm extruder is configured to inject the colored polymer melt concentrate into the transfer line in a direction perpendicular to the flow direction of the polymer melt from the primary polymer melt source to the product forming device.

Aspect 13: The system any one of aspects 1-10, wherein the side arm extruder is configured to inject the colored polymer melt concentrate into the transfer line in a direction co-current with the flow direction of the polymer melt from the primary polymer melt source to the product forming device.

Aspect 14: The system of any one of aspects 6-13, wherein the melt pump is capable of changing pump rotation direction.

Aspect 15: The system of any one of the preceding aspects, further comprising a color sensor that is positioned to measure a color of product that is formed from the product forming device.

Aspect 16: The system of any one of the preceding aspects, further comprising a winder having a spindle axis, the winder comprising a spindle that is configured to be rotatably driven about the spindle axis, wherein the color probe that is positioned with respect to the spindle to measure a color of yarn wound on the spindle.

Aspect 17: The system of aspect 16, wherein the color probe has a measuring direction, wherein the measuring direction of the color probe is within thirty degrees of the spindle axis.

Aspect 18: The system of aspect 17, wherein the measuring direction of the color probe is substantially parallel to the spindle axis.

Aspect 19: The system of any one of aspects 16-18, wherein the winder is configured to position the color probe within a select radial offset from a circumferential surface of a yarn package on the spindle.

Aspect 20: The system of aspect 19, wherein the spindle is movable on the winder about a rotational axis that is parallel to and offset from the spindle axis, wherein the spindle is configured to move about the rotational axis to maintain a portion of a circumferential surface of the yarn package in a position within select boundaries as the yarn package increases in diameter, wherein the color probe is coupled to the winder in a position proximate to the portion of the circumferential surface of the yarn package that is maintained within the select boundaries.

Aspect 21: The system of any one of aspects 16-20, wherein the spindle is configured to wind a yarn package to have a longitudinal end, wherein the color probe is positioned on the winder to have a spacing that is less than 20 mm from the longitudinal end of the yarn package.

Aspect 22: The system of any one of aspects 16-21, wherein the color probe is adjustably coupled to the winder to adjust the spacing from the longitudinal end of the yarn package.

Aspect 23: The system of aspect 22, further comprising: a rail that is elongate on an axis that is parallel to the spindle axis, wherein the color probe is coupled to the rail; a stepper motor that is configured to move the rail to position the color probe relative to the longitudinal end of the yarn package; a range sensor that is configured to determine a distance to the longitudinal end of the yarn package; and a controller, wherein the controller is operative to: receive a distance measurement from the range sensor, and based on the distance measurement, cause the stepper motor to move the rail to adjust the spacing from the color probe to the longitudinal end of the yarn package.

Aspect 24: The system of aspect 23, wherein the range sensor is a laser range sensor.

Aspect 25: The system of aspect 15, further comprising a draw-texturizing panel, wherein the color probe is configured to measure the color of yarn on the draw-texturizing panel.

Aspect 26: The system of aspect 16, wherein the yarn package has a circumferential surface, wherein the color probe is configured to measure a color of the circumferential surface of the yarn package.

Aspect 27: The system of any one of aspects 16-26, further comprising a controller that is operative to compare a color measurement from the color probe to a predetermined specification, and, in response to measuring the color measurement being outside of a predetermined tolerance of the predetermined specification, causing at least one response.

Aspect 28: The system of aspect 27, wherein the at least one response is selected from the group consisting of: stopping the primary polymer melt source, changing an injection rate of the first colored polymer melt concentrate, doffing the yarn package, and triggering an alarm.

Aspect 29: A method of producing a colored polymer melt comprising the steps of: (a) flowing a primary polymer melt in a transfer line from a primary polymer melt source in a flow direction that is towards a product forming device; and (b) injecting a first colored polymer melt concentrate from an outlet of a side arm extruder assembly into the flowing primary polymer melt, thereby producing a first colored polymer melt.

Aspect 30: The method of aspect 29, wherein the primary polymer melt is a non-colored polymer melt.

Aspect 31: The method of aspect 29 or aspect 30, wherein the product forming device is a spinneret.

Aspect 32: The method of any one of aspects 29-31, wherein the primary melt polymer source is a main extruder.

Aspect 33: The method of any one of aspects 29-32, wherein the method further comprises mixing the first colored polymer melt with a mixer.

Aspect 34: The method of any one of aspects 29-33, wherein the method further comprises producing first colored fibers from the first colored polymer melt.

Aspect 35: The method of any one of aspects 29-34, wherein the method further comprises after step (b): (c) stopping injecting the first colored polymer melt concentrate from a side arm extruder assembly into the flowing primary polymer melt, thereby stopping producing the first colored polymer melt, (d) purging the first colored polymer melt concentrate from the side arm extruder assembly, (e) introducing a second colored polymer melt concentrate into the side arm extruder assembly, and (f) injecting the second colored polymer melt concentrate from a side arm extruder assembly into the flowing primary polymer melt, thereby producing a second colored polymer melt.

Aspect 36: The method of any one of aspects 29-35, wherein steps c-f are performed in less than 90 minutes.

Aspect 37: The method of any one of aspects 29-35, wherein steps c-f are performed in less than 20 minutes.

Aspect 38: The method of any one of aspects 29-35, wherein steps c-f are performed in less than 10 minutes.

Aspect 39: The method of any one of aspects 29-38, wherein the second colored polymer melt concentrate is a different color than the first colored polymer melt concentrate.

Aspect 40: The method of any one of aspects 29-39, wherein injecting the first colored polymer melt concentrate from the side arm extruder assembly into the flowing primary polymer melt comprises injecting the first colored polymer melt concentrate in a direction counter to the flow direction of the polymer melt.

Aspect 41: The method of any one of aspects 29-40, wherein injecting the first colored polymer melt concentrate from the side arm extruder assembly into the flowing primary polymer melt comprises injecting the first colored polymer melt concentrate in a direction perpendicular to the flow direction of the polymer melt from the primary polymer melt source to the product forming device.

Aspect 42: The method of any one of aspects 29-41, wherein injecting the first colored polymer melt concentrate from the side arm extruder assembly into the flowing primary polymer melt comprises injecting the first colored polymer melt concentrate in a direction co-current with the flow direction of the polymer melt from the primary polymer melt source to the product forming device.

Aspect 43: The method of any one of aspects 29-42, wherein the primary polymer melt is one of a virgin non-colored polymer melt, a recycled non-colored polymer melt, or a combination thereof Aspect 44: The method of any one of aspects 29-43, wherein the colored polymer melt concentrate comprises an additive, wherein the additive comprises at least one of a deep dye additive, a light dye additive, TiO2, a UV stabilizer, a processing aid, or a process stabilizer, or a combination thereof.

Aspect 45: The method of any one of aspects 29-44, further comprising measuring a color value of the first colored fibers with a color probe.

Aspect 46: The method of aspect 45, further comprising continuously producing a yarn package from the first colored fibers on a winder and measuring the color value of the yarn package using the color probe.

Aspect 47: The method of aspect 45 or aspect 46, wherein measuring the color value of the first colored fibers using the color probe comprises continually measuring the color value of the yarn package.

Aspect 48: The method of any one of aspects 45-47, wherein the color value is one of $\Delta E$, $\Delta E_{CMC}$, $\Delta L^*$, $\Delta L_{CMC}$, $\Delta a^*$, $\Delta b^*$, $\Delta C^*$, $\Delta H^o$, $L^*$, $L_{CMC}$, $a^*$, $b^*$, $C^*$, or $H^o$.

Aspect 49: The method of any one of aspects 45, 46, or 48, wherein the color probe is configured to intermittently measure the color value.

Aspect 50: The method of any one of aspects 45-49, further comprising: receiving a distance measurement from a range sensor, and based on the distance measurement, adjusting a spacing from the color probe to a longitudinal end of the yarn package.

Aspect 51: The method of aspect 50, wherein adjusting the spacing from the color probe to the longitudinal end of the yarn package comprises causing a stepper motor to move the color probe relative to the longitudinal end of the yarn package.

Aspect 52: The method of aspect 50 or aspect 51, wherein the range sensor is a laser range sensor.

Aspect 53: The method of any one of aspects 45-52, further comprising: positioning the color probe within a select radial offset from a circumferential surface of the yarn package on the spindle.

Aspect 54: The method of any one of aspects 45-53, further comprising: comparing the color value to a predetermined specification, and in response to determining that the color value is outside of a predetermined tolerance of the predetermined specification, causing at least one response.

Aspect 55: The method of aspect 54, wherein the at least one response is selected from the group consisting of: stopping the primary polymer melt source, changing an injection rate of the first colored polymer melt concentrate, doffing the yarn package from the winder, and triggering an alarm.

Aspect 56: A winder for forming a yarn package, the winder having a spindle axis and comprising: a spindle that is configured to be rotatably driven about the spindle axis; and a color probe that is positioned with respect to the spindle to measure a color value of yarn wound on the spindle.

Aspect 57: The winder of aspect 56, wherein the color probe has a measuring direction, wherein the measuring direction of the color probe is within thirty degrees of the spindle axis.

Aspect 58: The winder of aspect 57, wherein the measuring direction of the color probe is substantially parallel to the spindle axis.

Aspect 59: The winder of any one of aspects 56-58, wherein the winder is configured to position the color probe within a select radial offset from a circumferential surface of the yarn package on the spindle.

Aspect 60: The winder of aspect 59, wherein the spindle is movable on the winder about a rotational axis that is parallel to and offset from the spindle axis, wherein the spindle is configured to move about the rotational axis to maintain a portion of a circumferential surface of the yarn package in a position between select boundaries as the yarn package increases in diameter, wherein the color probe is coupled to the winder in a position proximate to the portion of the circumferential surface of the yarn package that is maintained within the select boundaries.

Aspect 61: The winder of any one of aspects 56-60, wherein the spindle is configured to wind the yarn package to have a longitudinal end, wherein the color probe is positioned on the winder to have a spacing that is less than 20 mm from the longitudinal end of the yarn package.

Aspect 62: The winder of any one of aspects 56-61, wherein the color probe is adjustably coupled to the winder to adjust the spacing from the longitudinal end of the yarn package.

Aspect 63: The winder of aspect 62, further comprising: a rail that is elongate on an axis that is parallel to the spindle axis, wherein the color probe is coupled to the rail; a stepper motor that is configured to move the rail to position the color probe relative to the longitudinal end of the yarn package; a range sensor that is configured to determine a distance to the longitudinal end of the yarn package; and a controller, wherein the controller is operative to: receive a distance measurement from the range sensor, and based on the distance measurement, cause the stepper motor to move the rail to adjust the spacing from the color probe to the longitudinal end of the yarn package.

Aspect 64: The winder of aspect 63, wherein the range sensor is a laser range sensor.

Aspect 65: The winder of any one of aspects 56-64, further comprising a controller, wherein the controller is operative to: compare a color measurement from the color probe to a predetermined specification, and, in response to measuring the color measurement being outside of a predetermined threshold of the predetermined specification, provide an output.

Aspect 66: The winder of any one of aspects 56-65, wherein the color value is one of $\Delta E$, $\Delta E_{CMC}$, $\Delta L^*$, $\Delta L_{CMC}$, $\Delta a^*$, $\Delta b^*$, $\Delta C^*$, $\Delta H^0$, $L^*$, $L_{CMC}$, $a^*$, $b^*$, $C^*$, or $H^0$.

Aspect 67: A method comprising: obtaining a yarn color measurement of yarn, wherein the yarn color measurement is taken along a yarn path between a spinneret and a yarn package around which the yarn is wound.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A system for making a polymeric product comprising:
   a) a primary polymer melt source configured to receive a polymer feedstock composition, wherein the primary polymer melt source has an outlet in fluid communication with a transfer line configured to receive a polymer melt from the primary polymer melt source and transfer the polymer melt in a flow direction that is towards a product forming device, the transfer line having a first end at the outlet of the primary melt source and an opposed second end at the product forming device; and
   b) a side arm extruder assembly comprising an outlet positioned within the transfer line between the first end and the second end of the transfer line to inject a colored polymer melt concentrate into the transfer line, wherein the side arm extruder assembly further comprises an extruder, a first valve, and a melt pump, wherein the extruder, the first valve, and the melt pump are external to the transfer line;
   c) wherein an outlet of the extruder is in fluid communication with an inlet of the melt pump;
   d) wherein an outlet of the melt pump is in fluid communication with an inlet of a product channel in the first valve;
   e) wherein the first valve further comprises a purge channel;
   f) wherein the first valve further comprises a diverter that can selectively be positioned to direct a flow of the colored polymer melt concentrate from the melt pump to the purge channel via a portion of the product channel; and
   g) wherein an outlet of the product channel in the first valve is in fluid communication with the outlet of the side arm extruder assembly.

2. The system of claim 1, wherein the primary polymer melt source is a main extruder.

3. The system of claim 1, wherein the primary polymer melt source is one of a melting pin or a polymerization reactor.

4. The system of claim 1, wherein the product forming device is a spinneret.

5. The system of claim 1, wherein the product forming device is one of an injection mold, a blow mold, a film die, a pipe die, a profile die, a thermoforming die, a pelletizer, or an extruder.

6. The system of claim 1, further comprising a first filter positioned between the extruder and the melt pump.

7. The system of claim 1, wherein the transfer line comprises a mixer positioned between the outlet of the side arm extruder assembly and the product forming device.

8. The system of claim 1, wherein the side arm extruder assembly is configured to inject the colored polymer melt concentrate into the transfer line in a direction counter to the flow direction of the polymer melt from the primary polymer melt source to the product forming device.

9. The system of claim 1, further comprising:
   a hopper in communication with the extruder, wherein the hopper is configured to feed colored polymer concentrate into the extruder, wherein the side arm extruder assembly is configured to melt the colored polymer concentrate to form the colored polymer melt concentrate;
   a first level sensor that is configured to detect a presence or absence of the colored polymer concentrate at a first level within the hopper; and
   a second level sensor that is configured to detect a presence or absence of the colored polymer concentrate at a second level within the hopper, wherein the second level is vertically above the first level.

10. The system of claim 9, further comprising a processor that is in communication with each of the first level sensor and the second level sensor.

11. The system of claim 9, wherein each of the first level sensor and the second level sensor is a proximity switch.

12. The system of claim 10, wherein the processor is configured to provide a first indication upon the first level sensor detecting an absence of the colored polymer concentrate at the first level, and wherein the processor is configured to provide a second indication upon the second level sensor detecting an absence of the colored polymer concentrate at the second level.

13. The system of claim 10, further comprising a dryer that is in communication with the hopper, wherein the dryer is configured to selectively provide the colored polymer concentrate to the hopper, wherein the processor is in communication with the dryer, wherein the processor is configured to cause the dryer to provide the colored polymer concentrate to the hopper upon the first level sensor detecting an absence of the colored polymer concentrate at the first level, and wherein the processor is configured to cease provision of the colored polymer concentrate to the hopper upon the second level sensor detecting a presence of the colored polymer concentrate at the second level.

14. The system of claim 1, further comprising a winder having a spindle axis, the winder comprising a spindle that is configured to be rotatably driven about the spindle axis, wherein the winder comprises a color probe that is positioned with respect to the spindle to measure a color of yarn wound on the spindle.

15. The system of claim 14, further comprising a controller that is operative to compare a color measurement from the color probe to a predetermined specification, and, in response to measuring the color measurement being outside of a predetermined threshold of the predetermined specification, causing at least one response.

16. A method of producing a colored polymer melt by the system of claim 1 comprising the steps of:
   a) flowing a primary polymer melt in a transfer line from a primary polymer melt source in a flow direction that is towards a product forming device;
   b) injecting a first colored polymer melt concentrate from an outlet of a side arm extruder assembly into the flowing primary polymer melt, thereby producing a first colored polymer melt; and
   c) stopping injecting the first colored polymer melt concentrate from a side arm extruder assembly into the flowing primary polymer melt, thereby stopping producing the first colored polymer melt,
   d) purging the first colored polymer melt concentrate from the side arm extruder assembly through a purge channel of a valve, wherein the side arm extruder assembly comprises an extruder, wherein the valve is positioned between the extruder and the outlet of the side arm extruder assembly,
   e) introducing a second colored polymer melt concentrate into the side arm extruder assembly, and
   f) injecting the second colored polymer melt concentrate from a side arm extruder assembly into the flowing primary polymer melt, thereby producing a second colored polymer melt.

17. The method of claim 16, wherein steps c-f are performed in less than 20 minutes.

18. The method of claim 16, wherein the second colored polymer melt concentrate is a different color than the first colored polymer melt concentrate.

19. The method of claim 18, further comprising determining a difficulty classification of a color change between the first colored polymer melt concentrate and the second colored polymer melt concentrate.

20. The method of claim 19, further comprising purging the first colored polymer melt concentrate from the side arm extruder assembly through the purge channel of the valve based on the difficulty classification of the color change between the first colored polymer melt concentrate and the second colored polymer melt concentrate.

\* \* \* \* \*